US012634662B2

(12) United States Patent
Jiang

(10) Patent No.: US 12,634,662 B2
(45) Date of Patent: May 19, 2026

(54) METHOD AND APPARATUS FOR RECEIVING MULTICAST BROADCAST SERVICE DATA

(71) Applicant: Beijing Xiaomi Mobile Software Co., Ltd., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 335 days.

(21) Appl. No.: 18/261,235

(22) PCT Filed: Jan. 13, 2021

(86) PCT No.: PCT/CN2021/071604
§ 371 (c)(1),
(2) Date: Jul. 12, 2023

(87) PCT Pub. No.: WO2022/151104
PCT Pub. Date: Jul. 21, 2022

(65) Prior Publication Data
US 2024/0314521 A1 Sep. 19, 2024

(51) Int. Cl.
*H04H 20/71* (2008.01)
*H04W 4/06* (2009.01)
*H04W 76/10* (2018.01)
*H04W 76/40* (2018.01)

(52) U.S. Cl.
CPC ............. *H04W 4/06* (2013.01); *H04W 76/10* (2018.02); *H04W 76/40* (2018.02)

(58) Field of Classification Search
USPC ........................................................ 370/312
See application file for complete search history.

(56) References Cited

U.S. PATENT DOCUMENTS

| | | | | |
|---|---|---|---|---|
| 11,470,676 | B2 * | 10/2022 | Chen | H04L 5/0096 |
| 12,335,817 | B2 * | 6/2025 | Xu | H04W 4/06 |
| 2021/0112379 | A1 * | 4/2021 | Ge | H04W 76/11 |
| 2021/0153097 | A1 * | 5/2021 | Du | H04W 40/20 |
| 2022/0286918 | A1 * | 9/2022 | Wang | H04W 36/0009 |
| 2022/0312279 | A1 * | 9/2022 | Wu | H04W 36/0085 |
| 2023/0388866 | A1 * | 11/2023 | Di Gorolamo | H04W 36/0007 |

FOREIGN PATENT DOCUMENTS

| | | |
|---|---|---|
| CN | 101155346 A | 4/2008 |
| CN | 101163334 A | 4/2008 |
| CN | 101267593 A | 9/2008 |
| CN | 101494821 A | 7/2009 |
| CN | 107690163 A | 2/2018 |
| CN | 110650454 A | 1/2020 |
| CN | 110839267 A | 2/2020 |
| CN | 110944368 A | 3/2020 |
| CN | 110958653 A | 4/2020 |
| RU | 2635870 C1 | 11/2017 |

* cited by examiner

*Primary Examiner* — Chuong T Ho
(74) *Attorney, Agent, or Firm* — McCoy Russell LLP

(57) ABSTRACT

A multicast broadcast service data receiving method, including: receiving first indication information sent by a network side, the first indication information being used for establishing a source connection between a terminal device and a source cell and a target connection between the terminal device and a target cell; receiving multicast broadcast service data from the source cell by means of the source connection; and receiving multicast broadcast service data from the target cell by means of the target connection.

19 Claims, 10 Drawing Sheets

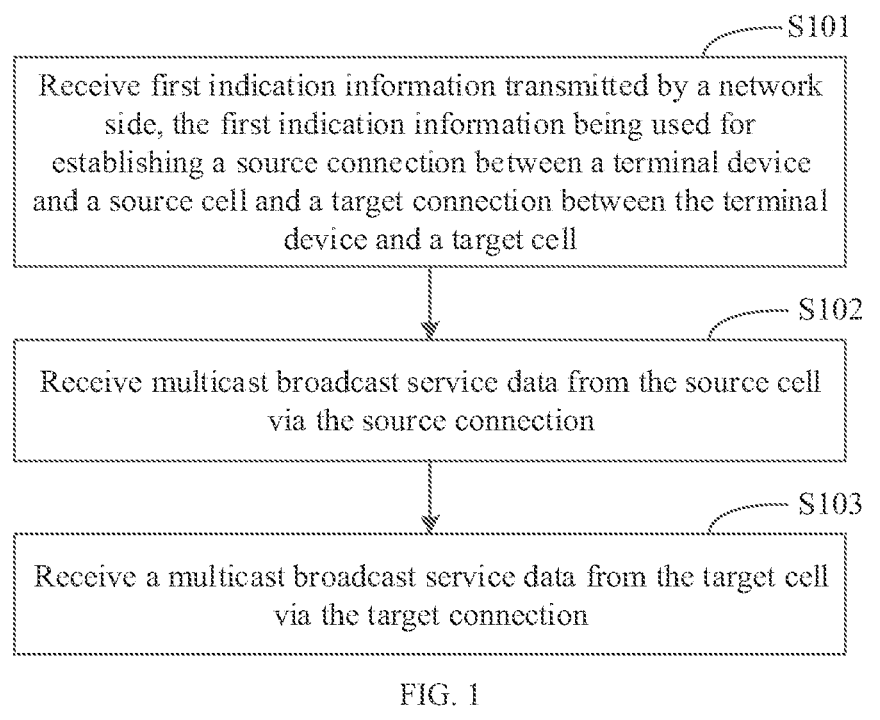

S101

Receive first indication information transmitted by a network side, the first indication information being used for establishing a source connection between a terminal device and a source cell and a target connection between the terminal device and a target cell

S102

Receive multicast broadcast service data from the source cell via the source connection

S103

Receive a multicast broadcast service data from the target cell via the target connection

FIG. 1

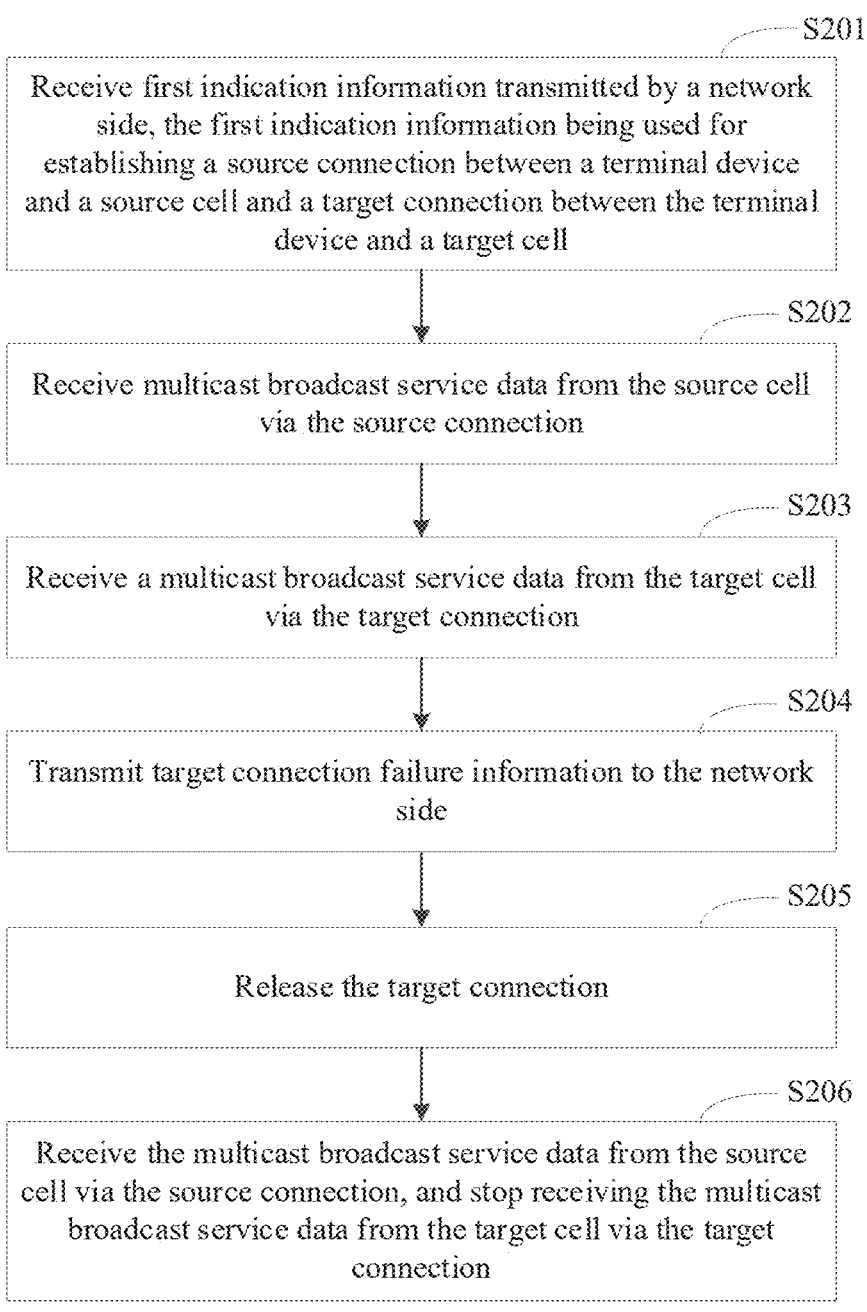

S201

Receive first indication information transmitted by a network side, the first indication information being used for establishing a source connection between a terminal device and a source cell and a target connection between the terminal device and a target cell

S202

Receive multicast broadcast service data from the source cell via the source connection

S203

Receive a multicast broadcast service data from the target cell via the target connection

S204

Transmit target connection failure information to the network side

S205

Release the target connection

S206

Receive the multicast broadcast service data from the source cell via the source connection, and stop receiving the multicast broadcast service data from the target cell via the target connection

FIG. 2

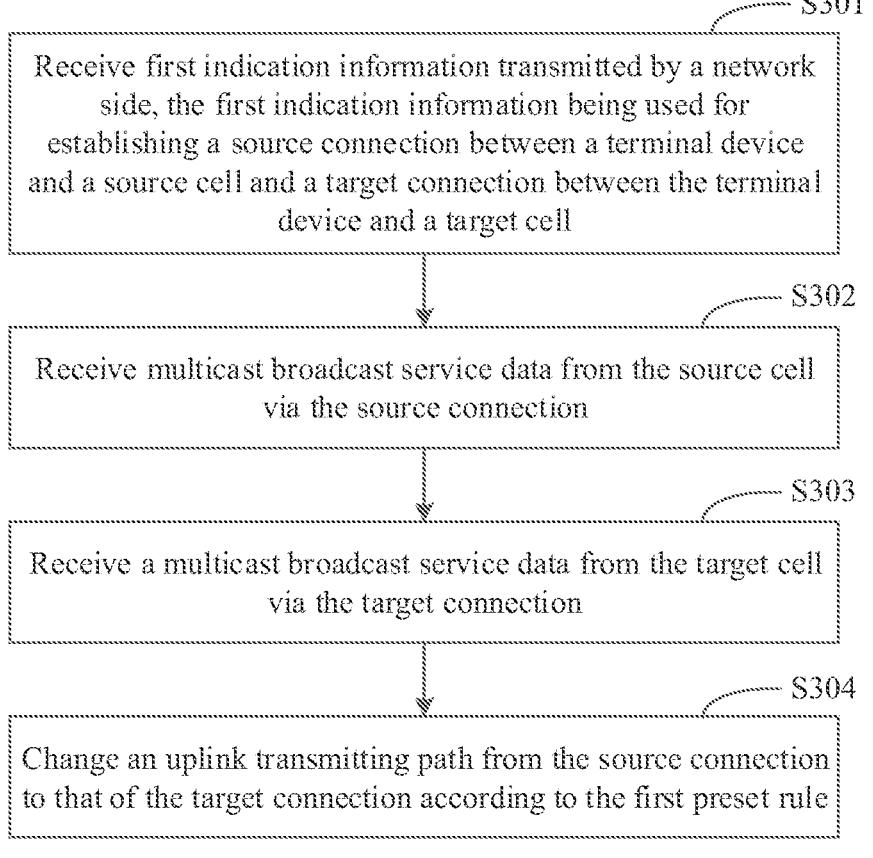

S301

Receive first indication information transmitted by a network side, the first indication information being used for establishing a source connection between a terminal device and a source cell and a target connection between the terminal device and a target cell

S302

Receive multicast broadcast service data from the source cell via the source connection

S303

Receive a multicast broadcast service data from the target cell via the target connection

S304

Change an uplink transmitting path from the source connection to that of the target connection according to the first preset rule

FIG. 3

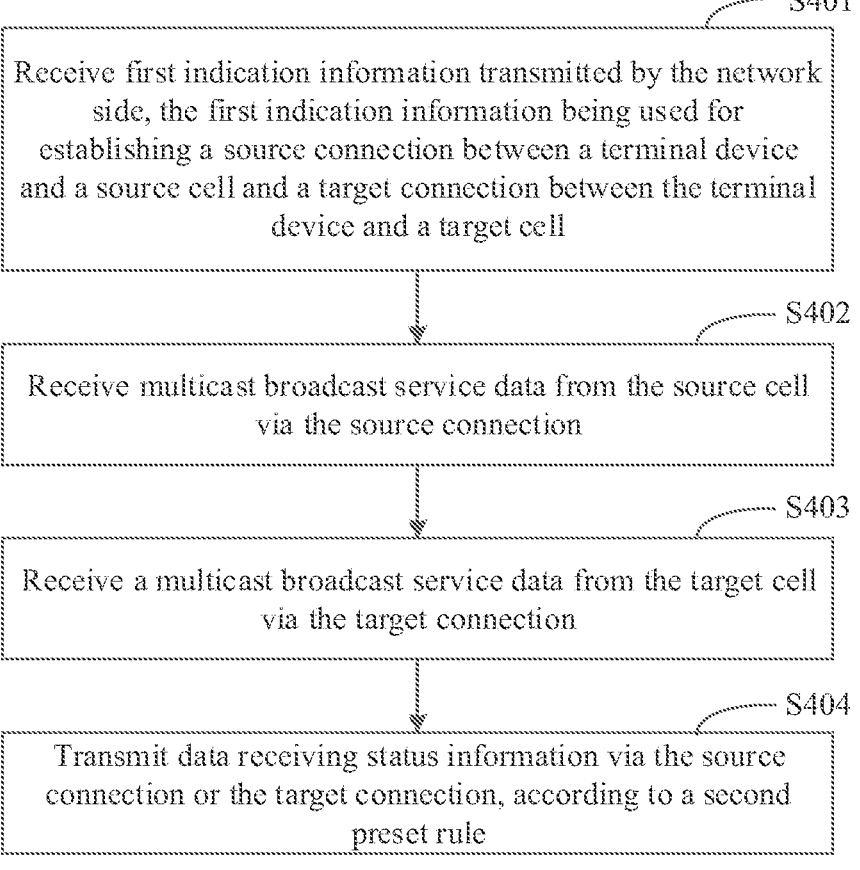

Receive first indication information transmitted by the network side, the first indication information being used for establishing a source connection between a terminal device and a source cell and a target connection between the terminal device and a target cell — S401

Receive multicast broadcast service data from the source cell via the source connection — S402

Receive a multicast broadcast service data from the target cell via the target connection — S403

Transmit data receiving status information via the source connection or the target connection, according to a second preset rule — S404

FIG. 4

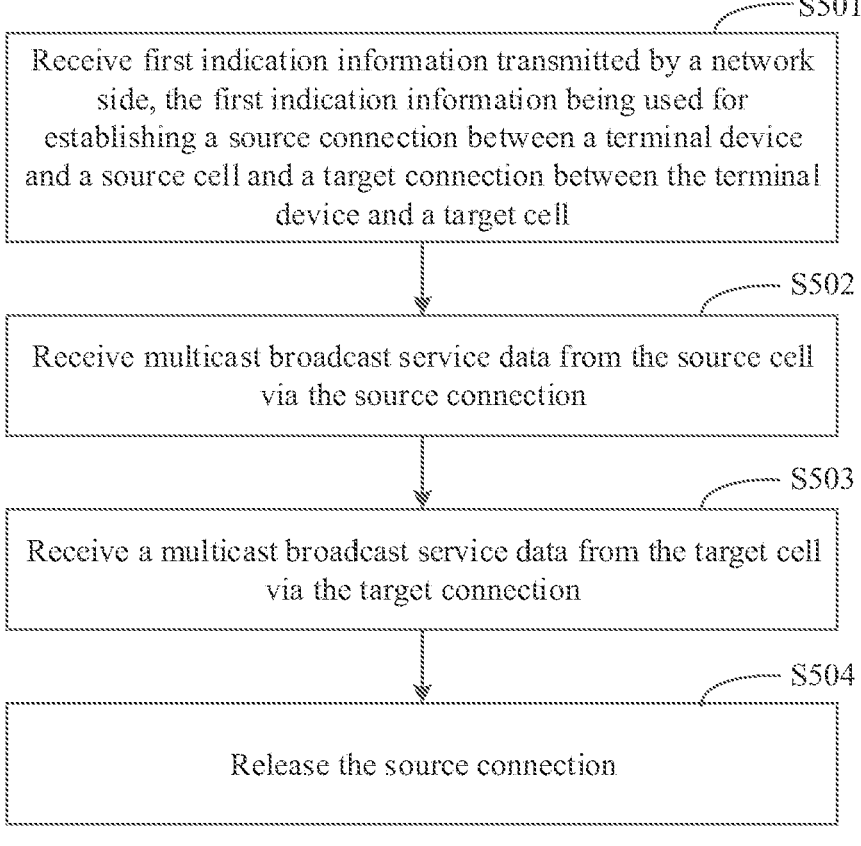

S501

Receive first indication information transmitted by a network side, the first indication information being used for establishing a source connection between a terminal device and a source cell and a target connection between the terminal device and a target cell

S502

Receive multicast broadcast service data from the source cell via the source connection

S503

Receive a multicast broadcast service data from the target cell via the target connection

S504

Release the source connection

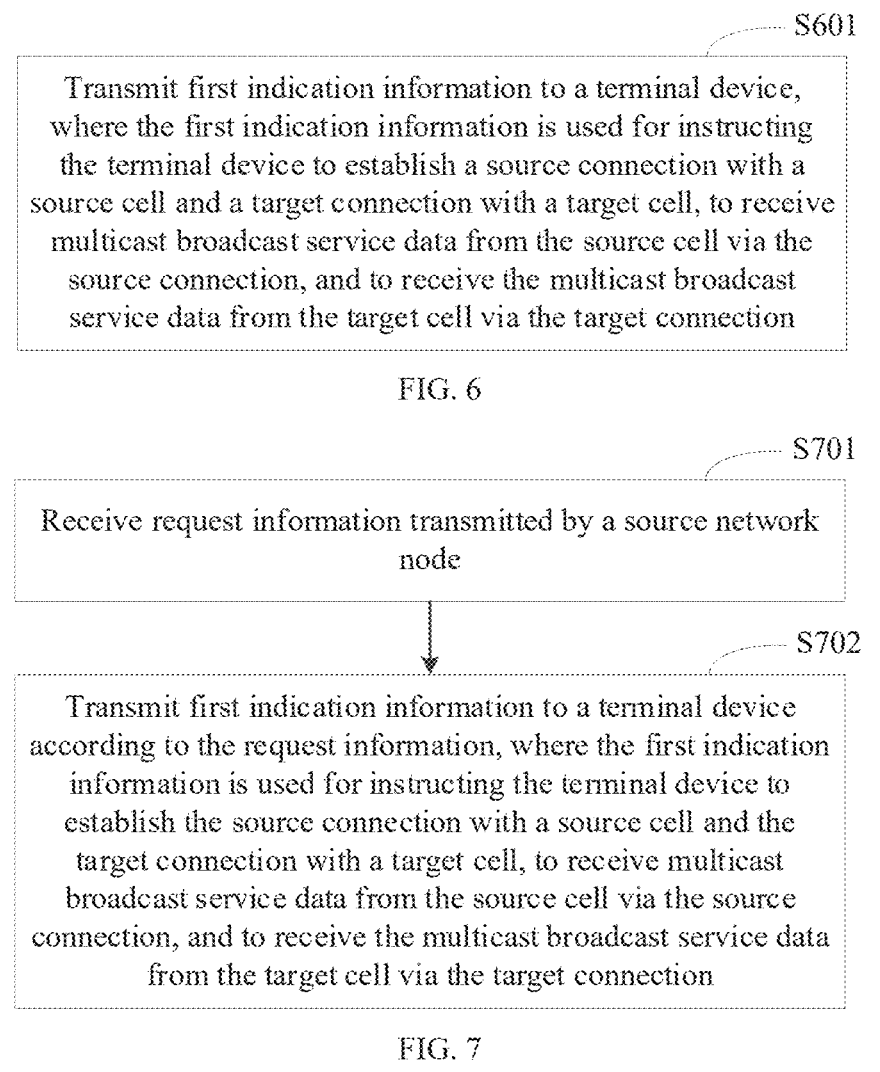

Transmit first indication information to a terminal device, where the first indication information is used for instructing the terminal device to establish a source connection with a source cell and a target connection with a target cell, to receive multicast broadcast service data from the source cell via the source connection, and to receive the multicast broadcast service data from the target cell via the target connection

Receive request information transmitted by a source network node

S702

Transmit first indication information to a terminal device according to the request information, where the first indication information is used for instructing the terminal device to establish the source connection with a source cell and the target connection with a target cell, to receive multicast broadcast service data from the source cell via the source connection, and to receive the multicast broadcast service data from the target cell via the target connection

FIG. 7

METHOD AND APPARATUS FOR RECEIVING MULTICAST BROADCAST SERVICE DATA

CROSS REFERENCE TO RELATED APPLICATION

The present application is a U.S. National Phase of International Application No. PCT/CN2021/071604 entitled "MULTICAST BROADCAST SERVICE DATA RECEIVING METHOD AND APPARATUS," and filed on Jan. 13, 2021. The entire contents of the above-listed application are hereby incorporated by reference for all purposes.

BACKGROUND

At present, when the terminal device receives service data, such as Multicast Broadcast Service (MBS) data, situations where the service data cannot be received may occur, resulting in additional data receiving delay.

SUMMARY

The present disclosure relates to the field of communications, and in particular to a method and apparatus for receiving multicast broadcast service data.

An embodiment of the first aspect of the present disclosure discloses a method for receiving multicast broadcast service data, which is performed by a terminal device, the method including: receiving first indication information transmitted by a network-side device, the first indication information being used for establishing a source connection between the terminal device and a source cell and a target connection between the terminal device and a target cell; receiving multicast broadcast service data from the source cell via the source connection; and receiving the multicast broadcast service data from the target cell via the target connection.

An embodiment of the second aspect of the present disclosure discloses a method for receiving multicast broadcast service data, which is performed by the network-side device, the method including: transmitting first indication information to a terminal device, the first indication information being used for instructing the terminal device to establish a source connection with a source cell and a target connection with a target cell, receiving multicast broadcast service data from the source cell via the source connection, and receiving the multicast broadcast service data from the target cell via the target connection.

An embodiment of the third aspect of the present disclosure discloses a method for receiving multicast broadcast service data, which is performed by the network-side device, the method including: receiving request information transmitted by a source network node; transmitting first indication information to a terminal device via the source network node according to the request information, the first indication information being used for instructing the terminal device to establish a source connection with a source cell and a target connection with a target cell; and receiving multicast broadcast service data from the source cell via the source connection, and receiving multicast broadcast service data from the target cell via the target connection.

An embodiment of the fourth aspect of the present disclosure discloses a communication apparatus, including: at least one processor; and a memory communicatively connected with the at least one processor, where the memory stores instructions executable by the at least one processor, and when executed by the at least one processor, the instructions cause the at least one processor to perform the method for receiving multicast broadcast service data according to the embodiment of the first aspect of the present disclosure.

An embodiment of the fifth aspect of the present disclosure discloses a communication apparatus, including: at least one processor; and a memory communicatively connected with the at least one processor, where the memory stores instructions executable by the at least one processor, and when executed by the at least one processor, the instructions cause the at least one processor to perform the method for receiving multicast broadcast service data according to an embodiment of the second aspect of the present disclosure, or perform the method for receiving multicast broadcast service data according to the third aspect of the present disclosure.

An embodiment of the sixth aspect of the present disclosure discloses a non-transitory computer-readable storage medium storing computer instructions, the computer instructions being used for causing the computer to perform the method for receiving multicast broadcast service data as described in the embodiment of the first aspect of the present disclosure.

An embodiment of the seventh aspect of the present disclosure discloses a non-transitory computer-readable storage medium storing computer instructions, the computer instructions being used for causing the computer to perform the method for receiving multicast broadcast service data as described in the embodiment of the third aspect of the present disclosure.

An embodiment of the eighth aspect of the present disclosure discloses a computer program product, including a computer program, where when the computer program is executed by a processor, the method for receiving multicast broadcast service data as described in the embodiment of the first aspect of the present disclosure is implemented.

An embodiment of the ninth aspect of the present disclosure discloses a computer program product, including a computer program, where when the computer program is executed by a processor, the method for receiving multicast broadcast service data as described in the embodiment of the second aspect of the present disclosure is implemented, or the method for receiving multicast broadcast service data as described in the embodiment of the third aspect of the present disclosure is performed.

An embodiment of the tenth aspect of the present disclosure discloses a system for receiving multicast broadcast service data, including a terminal device and a network-side device, where the network-side device is used for transmitting first indication information to the terminal device, the terminal device is used for receiving first indication information transmitted by the network-side device, the first indication information is used for establishing a source connection between the terminal device and a source cell and a target connection between the terminal device and a target cell; the terminal device is further used for receiving multicast broadcast service data from the source cell via the source connection; and the terminal device is further used for receiving multicast broadcast service data from the target cell via the target connection.

Additional aspects and advantages of the present disclosure will be set forth partially in the following description, which will become obvious in the following description, or can be learned by practice of the present disclosure.

BRIEF DESCRIPTION OF THE DRAWINGS

The above and/or additional aspects and advantages of the disclosure will become obvious and comprehensible from the description of embodiments in conjunction with the drawings, where FIG. 1 is a schematic flow diagram of a method for receiving multicast broadcast service data according to an embodiment of the present disclosure;

FIG. 2 is a schematic flow diagram of another method for receiving multicast broadcast service data according to an embodiment of the present disclosure;

FIG. 3 is a schematic flow diagram of another method for receiving multicast broadcast service data according to an embodiment of the present disclosure;

FIG. 4 is a schematic flow diagram of another method for receiving multicast broadcast service data according to an embodiment of the present disclosure;

FIG. 5 is a schematic flow diagram of another method for receiving multicast broadcast service data according to an embodiment of the present disclosure;

FIG. 6 is a schematic flow diagram of another method for receiving multicast broadcast service data according to an embodiment of the present disclosure;

FIG. 7 is a schematic flow diagram of another method for receiving multicast broadcast service data according to an embodiment of the present disclosure;

DETAILED DESCRIPTION

Figures 8, 9:
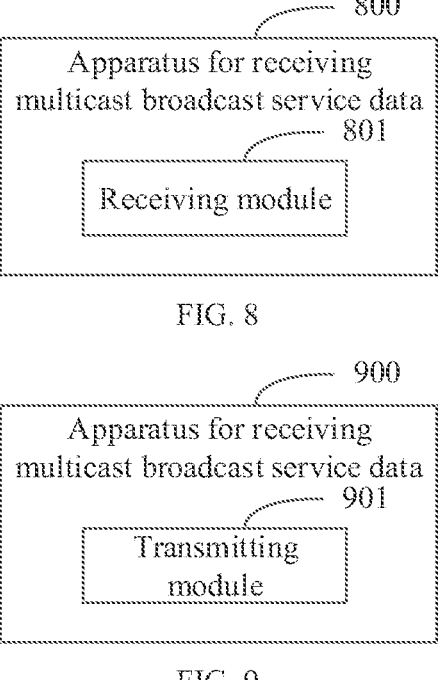
FIG. 8 is a schematic structural diagram of an apparatus for receiving multicast broadcast service data according to an embodiment of the present disclosure.
FIG. 9 is a schematic structural diagram of another apparatus for receiving multicast broadcast service according to an embodiment of the present disclosure.

The embodiments of the present disclosure are described in detail below. Examples of the embodiments are shown in the accompanying drawings, in which the same or similar reference numerals represent the same or similar elements with the same or similar functions. The embodiments described with reference to the accompanying drawings are illustrative and only intended to explain the disclosure, instead of being construed as limiting the disclosure.

The present disclosure discloses a method and an apparatus for receiving multicast broadcast service, a terminal device, a network-side device, a communication apparatus, and a storage medium to solve the problem of additional data receiving delay generated by the failure of the terminal device to receive service data.

A network-side device involved in the embodiment of the present disclosure is specifically described as follows: the network-side device is deployed in a radio access network to provide a radio access function for a receiving device. The network-side device may be a base station (BS). The network-side device may communicate wirelessly with a receiving device via one or more antennas. The network-side device may provide communication coverage for a geographic area where the network-side device is located. The base station may include different types of base stations, such as a macro base station, a micro base station, a relay station, and an access point. In some embodiments, the base station may be referred to by those skilled in the art as a base station transceiver, a radio base station, an access point, a radio transceiver, a basic service set (BSS), an extended service set (ESS), a NodeB, an evolved NodeB (eNB or eNodeB), or some other appropriate terms. For example, in a 5G system, the base station is referred to as gNB. For convenience of description, in the embodiments of the present disclosure, the above-described apparatuses for providing a radio communication function for the receiving device are collectively referred to as the network-side device.

The terminal device involved in the embodiment of the present disclosure is specifically described as follows: The terminal device may be distributed throughout the communication system, and each terminal device may be stationary or mobile. The terminal device may further be referred to by those skilled in the art as a mobile station, a user station, a mobile unit, a user unit, a radio unit, a remote unit, a mobile device, a terminal device, a radio device, a radio communication device, a remote device, a mobile user station, an access terminal device, a mobile terminal device, a radio terminal device, a remote terminal device, a handheld device, a user agent, a mobile client, a client, or some other appropriate terms. The terminal device may be a cellular telephone, a personal digital assistant (PDA), a radio modem, a radio communication device, a handheld device, a tablet computer, a laptop computer, a cordless telephone, a radio local loop (WLL) station, etc., and may communicate with a base station in a mobile communication system.

FIG. 1 is a schematic flow diagram of a method for receiving multicast broadcast service data provided by an embodiment of the present disclosure, which is performed by a terminal device. As shown in FIG. 1, the method for receiving multicast broadcast service data includes the following steps: S101-S103.

In S101, first indication information transmitted by the network side is received, where the first indication information is used for establishing a source connection between a terminal device and a source cell and a target connection between the terminal device and a target cell.

At present, when the terminal device receives service data, such as Multicast Broadcast Service (MBS) data, situations where the service data cannot be received may occur, resulting in additional data receiving delay. For example, in the related art, when a terminal device performs cell handover, if a radio bearer which receives service data at present does not support the simultaneous establishment of connections between a source cell and a target cell, the terminal device needs to disconnect from the source cell first, and then establish a connection with the target cell, so that in this period, the terminal device is not connected to the cell and cannot receive service data, resulting in the additional data receiving delay.

In an embodiment of the present disclosure, the terminal device may receive the first indication information transmitted by the network side, the first indication information being used for establishing the source connection between the terminal device and the source cell and the target connection between the terminal device and the target cell.

In an embodiment of the present disclosure, the network side is the network-side device.

In some examples, the first indication information includes, but is not limited to, at least one of physical layer control information, Media Access Control (MAC) layer control information, or Radio Resource Control (RRC) layer information.

In some examples, the first indication information is indication information for a multicast broadcast service. In other words, the network side may respond to the service being the multicast broadcast service and transmit the first indication information to the terminal device; the first indication information is the instruction information for the multicast broadcast service.

In S102, the multicast broadcast service data is received from the source cell via the source connection.

In S103, the multicast broadcast service data is received from the target cell via the target connection.

In an embodiment of the present disclosure, the terminal device may receive the multicast broadcast service data from the source cell via the source connection, and may further receive the multicast broadcast service data from the target cell via the target connection. In other words, the terminal device may receive the multicast broadcast service data from the source cell and the target cell simultaneously, which can solve the problem of the receiving delay of the multicast broadcast service data generated during moving. In addition, the terminal device may simultaneously establish connections with the source cell and the target cell, and may still be connected to the other cell under the condition of the connection failure of one cell, thereby improving the reliability of receiving the service data.

In some examples, the source connection may correspond to one or more source cells, and one or more source cells corresponding to the source connection constitute a source cell group (SCG). The target connection may correspond to one or more target cells, and one or more target cells corresponding to the target connection constitute a target cell group (TCG). The source cell group and the target cell group each include at least one primary cell (PCell) and one or more secondary cells (SCells).

In some examples, the terminal device may receive multicast broadcast service information transmitted by the network side, the multicast broadcast service information including a multicast broadcast service identity. Therefore, the terminal device may receive the multicast broadcast service data from the source cell and the target cell according to the multicast broadcast service information (such as the multicast broadcast service identity).

In some examples, the multicast broadcast service identity includes at least one of: a temporary mobile group identity, a multicast broadcast service session identity; a multicast broadcast service flow identity; a multicast broadcast service bearer identity; a multicast broadcast service logical channel identity; a radio link control (RLC) entity identity for the multicast broadcast service; or a multicast scheduling identity. Among them, the Temporary Mobile Group Identity (TMGI) includes, but is not limited to, a Master Cell Group (MCG) identity, a Secondary Cell Group (SCG) identity, etc.

In some examples, the multicast broadcast service information further includes at least one of: an identity of the source cell, or an identity of the target cell. Therefore, the terminal device can determine the source cell from a plurality of cells according to the identity of the source cell to establish the source connection between the terminal device and the source cell, and can further determine the target cell from a plurality of cells according to the identity of the target cell to establish the target connection between the terminal device and the target cell.

In some examples, the source connection uses a unicast mode and/or a multicast mode, and the target connection uses a unicast mode and/or a multicast mode. It can be understood that the source connection and the target connection may be in a unicast mode, a multicast mode, or a unicast mode and a multicast mode. Among them, the unicast mode and the multicast mode are the simultaneous use of the unicast mode and the multicast mode. For example, the following nine possible implementations may be included.

Mode 1: the source connection uses a unicast mode, and the target connection uses a unicast mode.

Mode 2: the source connection uses a unicast mode, and the target connection uses a multicast mode.

Mode 3: the source connection uses a unicast mode, and the target connection uses a unicast mode and a multicast mode.

Mode 4: the source connection uses a multicast mode, and the target connection uses a unicast mode.

Mode 5: the source connection uses a multicast mode, and the target connection uses a multicast mode.

Mode 6: the source connection uses a multicast mode, and the target connection uses a unicast mode and a multicast mode.

Mode 7: the source connection uses a unicast mode and a multicast mode, and the target connection uses a unicast mode.

Mode 8: the source connection uses a unicast mode and a multicast mode, and the target connection uses a multicast mode.

Mode 9: the source connection uses a unicast mode and a multicast mode, and the target connection uses a unicast mode and a multicast mode.

In some examples, a radio bearer for receiving multicast broadcast service data in the terminal device includes a packet data convergence protocol (PDCP) entity; the received multicast broadcast service data may be submitted in sequence to an upper protocol entity of the packet data convergence protocol entity by the packet data convergence protocol entity, according to the sequence number of the service data. Among them, the upper protocol entity of the packet data convergence protocol entity may be the Internet Protocol (IP) layer.

The method for receiving multicast broadcast service data according to the embodiment of the present disclosure receives the first indication information transmitted by the network side, the first indication information being used for establishing the source connection between the terminal device and the source cell and the target connection between the terminal device and the target cell; receives the multicast broadcast service data from the source cell via the source connection; and receives the multicast broadcast service data from the target cell via the target connection. Therefore, the terminal device can receive the multicast broadcast service data from the source cell via the source connection, and can further receive the multicast broadcast service data from the target cell via the target connection, so that the terminal device can simultaneously receive the multicast broadcast service data via the source cell and the target cell, which can solve the problem of the receiving delay of the multicast broadcast service data generated during moving. In addition, the terminal device can simultaneously establish connections with the source cell and the target cell, and can still be connected to the other cell under the condition of the connection failure of one cell, thereby improving the reliability of receiving service data.

FIG. 2 is a schematic flow diagram of another method for receiving multicast broadcast service data provided by an embodiment of the present disclosure, which is performed by a terminal device. As shown in FIG. 2, the method for receiving multicast broadcast service data includes the following steps: S201-S206.

In S201, the first indication information transmitted by the network side is received, where the first indication information is used for establishing a source connection between a terminal device and a source cell and a target connection between the terminal device and a target cell.

In S202, the multicast broadcast service data is received from the source cell via the source connection.

In S203, the multicast broadcast service data is received from the target cell via the target connection.

In an embodiment of the present disclosure, steps S201, S202, and S203 may be implemented with any one of the methods of the embodiments of the present disclosure, which are not limited to the embodiments of the present disclosure and will not be repeated herein.

In S204, target connection failure information is transmitted to the network side.

It can be understood that due to the quality of wireless channels, etc., the target connection between the terminal device and the target cell may fail, and the terminal device may respond to target connection failure, generate the target connection failure information, and transmit the target connection failure information to the network side, so as to inform the network side of target connection failure in time.

In some examples, a target connection failure occurs before the terminal device receives second indication information transmitted by the network side, and the second indication information is used for instructing the terminal device to release the source connection; or the target connection failure occurs before the random access between the terminal device and the target cell is successfully completed.

In some examples, transmitting the target connection failure information to the network side may include the following three possible implementations.

Mode 1: a connection is re-established when the source connection fails, and the target connection failure information is transmitted to the network side via the re-established connection.

It can be understood that when the source connection fails, the connection may be re-established, and the target connection failure information is transmitted to the network side via the re-established connection, so as to inform the network side of the target connection failure in time.

Mode 2: a connection is re-established when the source connection fails, and the target connection failure information and source connection failure information are transmitted to the network side via the re-established connection.

It can be understood that when the source connection fails, the connection may be re-established, and the target connection failure information and the source connection failure information are transmitted to the network side via the re-established connection, so as to inform the network side of the target connection failure and the source connection failure in time.

Mode 3: the target connection failure information is transmitted to the network side via the source connection.

It can be understood that when the source connection succeeds, the target connection failure information may be transmitted to the network side via the source connection, so as to inform the network side of the target connection failure in time.

In S205, the target connection is released.

In an embodiment of the present disclosure, after the target connection failure information is transmitted to the network side, the target connection may be released, i.e., the target connection between the terminal device and the target cell is closed.

In S206, the multicast broadcast service data is received from the source cell via the source connection, and reception of the multicast broadcast service data from the target cell via the target connection is stopped.

According to the method for receiving multicast broadcast service data of an embodiment of the present disclosure, the target connection failure information is transmitted to the network side, the target connection is released, the multicast broadcast service data is received from the source cell via the source connection, and receiving the multicast broadcast service data from the target cell via the target connection is stopped. Therefore, when the target connection fails, the terminal device may transmit the target connection failure information to the network side, so as to inform the network side of target connection failure, and may further release the target connection, receive the multicast broadcast service data from the source cell via the source connection, and stops receiving the multicast broadcast service data from the target cell via the target connection.

FIG. 3 is a schematic flow diagram of another method for receiving multicast broadcast service data provided by an embodiment of the present disclosure, which is performed by a terminal device. As shown in FIG. 3, the method for receiving multicast broadcast service data includes the following steps: S301-S304.

In S301, the first indication information transmitted by the network side is received, where the first indication information is used for establishing a source connection between a terminal device and a source cell and a target connection between the terminal device and a target cell.

In S302, the multicast broadcast service data is received from the source cell via the source connection.

In S303, the multicast broadcast service data is received from the target cell via the target connection.

In an embodiment of the present disclosure, steps S301, S302, and S303 may be implemented with any one of the methods of the embodiments of the present disclosure, which are not limited to the embodiments of the present disclosure and will not be repeated herein.

In S304, an uplink transmission path is changed from the source connection to that of the target connection according to the first preset rule.

In an embodiment of the present disclosure, the terminal device may further change the uplink transmission path from the source connection to that of the target connection according to the first preset rule. Among them, the first preset rule may be set according to the actual condition, such as including a preset change trigger event.

In some examples, when the source connection and the target connection meet one of the following conditions, the terminal device may change the uplink transmission path from the source connection to that of the target connection according to the first preset rule.

Condition 1: the source connection uses a unicast mode, and the target connection uses a unicast mode and a multicast mode.

Condition 2: the source connection uses a unicast mode and a multicast mode, and the target connection uses a unicast mode.

Condition 3: the source connection uses a unicast mode and a multicast mode, and the target connection uses a unicast mode and a multicast mode.

In some examples, changing the uplink transmission path from the source connection to that of the target connection may include changing a unicast path of the source connection to a unicast path of the target connection. For example, when the source connection uses a unicast mode and a multicast mode, and the target connection uses a unicast mode and a multicast mode, changing the uplink transmission path from the source connection to the target connection may include: changing the unicast path of the source connection to the unicast path of the target connection.

According to the method for receiving multicast broadcast service data of an embodiment of the present disclosure, the terminal device may change the uplink transmission path from the source connection to that of the target connection according to the first preset rule, so as to change the uplink transmission path from the source connection to that of the target connection.

FIG. 4 is a schematic flow diagram of another method for receiving multicast broadcast service data provided by an embodiment of the present disclosure, which is performed by a terminal device. As shown in FIG. 4, the method for receiving multicast broadcast service data includes the following steps: S401-S404.

In S401, first indication information transmitted by the network side is received, where the first indication information is used for establishing a source connection between a terminal device and a source cell and a target connection between the terminal device and a target cell.

In S402, the multicast broadcast service data is received from the source cell via the source connection.

In S403, the multicast broadcast service data is received from the target cell via the target connection.

In an embodiment of the present disclosure, steps S401, S402, and S403 may be implemented with any one of the methods of the embodiments of the present disclosure, which are not limited to the embodiments of the present disclosure and will not be repeated herein.

In S404, data receiving status information is transmitted via the source connection or the target connection, according to a second preset rule.

In an embodiment of the present disclosure, the terminal device may transmit data receiving status information via the source connection or the target connection according to the second preset rule, so as to inform the network side of its own data receiving status information. Among them, the second preset rule may be set according to the actual condition.

In some examples, transmitting the data receiving status information via the source connection or the target connection according to the second preset rule may include the following two possible implementations.

Mode 1, the data receiving status information is transmitted via the target connection.

In an embodiment of the present disclosure, when the data receiving status information is transmitted via the target connection, the trigger event for the data receiving status information includes: the terminal device triggering a change of the transmission path, the terminal device releasing the source connection, and the source connection failure.

In some examples, transmitting the data receiving status information via the target connection may include the following two possible implementations.

First, the data receiving status information is transmitted via the target connection.

In some examples, when the source connection and the target connection meet one of the following conditions, the terminal device transmits the data receiving status information via the target connection.

Condition 1: the source connection uses a unicast mode and/or a multicast mode, and the target connection uses a unicast mode and a multicast mode.

Condition 2: the source connection uses a multicast mode, and the target connection uses a unicast mode.

Condition 2: the source connection uses a unicast mode and a multicast mode, and the target connection uses a unicast mode.

Second, the data receiving status information is transmitted via a unicast path of the target connection.

In some examples, when the source connection uses a unicast mode and/or a multicast mode, and the target connection uses a unicast mode and a multicast mode, the terminal device transmits the data receiving status information via the unicast path of the target connection.

Mode 2, the data receiving status information is transmitted via the target connection.

In an embodiment of the present disclosure, when the data receiving status information is transmitted via the source connection, a trigger event for the data receiving status information is a target connection failure.

In some examples, transmitting the data receiving status information via the source connection may include the following two possible implementations.

First, the data receiving status information is transmitted via the source connection.

In some examples, when the source connection and the target connection meet one of the following conditions, the terminal device transmits the data receiving status information via the source connection.

Condition 1: the source connection uses a unicast mode and a multicast mode, and the target connection uses a unicast mode and/or a multicast mode.

Condition 2: the source connection uses a unicast mode, and the target connection uses a multicast mode.

Condition 3: the source connection uses a unicast mode, and the target connection uses a unicast mode and a multicast mode.

Second, the data receiving status information is transmitted via a unicast path of the source connection.

In some examples, when the source connection uses a unicast mode and a multicast mode, and the target connection uses a unicast mode and/or a multicast mode, the terminal device transmits the data receiving status information via the unicast path of the source connection.

According to the method for receiving multicast broadcast service data of an embodiment of the present disclosure, the terminal device may transmit the data receiving status information via the source connection or the target connection according to the second preset rule, so as to inform the network side of its own data receiving status information in time.

FIG. 5 is a schematic flow diagram of another method for receiving multicast broadcast service data provided by an embodiment of the present disclosure, which is performed by a terminal device. As shown in FIG. 5, the method for receiving multicast broadcast service data includes the following steps: S501-S504.

In S501, first indication information transmitted by the network side is received, where the first indication information is used for establishing a source connection between a terminal device and a source cell and a target connection between the terminal device and a target cell.

In S502, the multicast broadcast service data is received from the source cell via the source connection.

In S503, the multicast broadcast service data is received from the target cell via the target connection.

In an embodiment of the present disclosure, steps S501, S502, and S503 may be implemented with any one of the methods of the embodiments of the present disclosure, which are not limited to the embodiments of the present disclosure and will not be repeated herein.

In S504, the source connection is released.

In an embodiment of the present disclosure, the terminal device may release the source connection, i.e., the source connection between the terminal device and the source cell is closed.

In some examples, before the source connection is released, second indication information transmitted by the network side may be further received, and the second indication information is used for indicating a release of the source connection. Therefore, the terminal device may release the source connection according to the second indication information of the network side.

In some examples, releasing the source connection may include: releasing the source connection according to a third preset rule. Among them, the third preset rule may be set according to the actual condition. For example, the third preset rule may include the successful completion of the random access between the terminal device and the target cell or the source connection failure.

In some examples, the type of the source connection failure is a radio link failure. For example, the radio link failure includes, but is not limited to, a physical layer failure, a random access failure at the Medium Access Control (MAC) layer (e.g., the number of accesses reaches the maximum number of random accesses), the Radio Link Control (RLC) layer reaching the maximum number of retransmissions, a beam failure (e.g., a beam recovery process failure), and a Listen Before Talk (LBT) failure.

In some examples, when the source connection fails, the source connection failure information may be transmitted to the network side, so as to inform the network side of the source connection failure in time.

In some examples, transmitting the source connection failure information may include the following three possible implementations.

Mode 1: the source connection failure information is transmitted to the network side via the target connection.

It can be understood that when the target connection succeeds, the source connection failure information may be transmitted to the network side via the target connection, so as to inform the network side of the source connection failure in time. Among them, the success of the target connection includes the situations where the target connection has been established and is being established.

Mode 2: when the target connection fails, a connection is re-established, and the source connection failure information is transmitted to the network side via the re-established connection.

It can be understood that when the target connection fails, the connection may be re-established, and the source connection failure information is transmitted to the network side via the re-established connection, so as to inform the network side of the source connection failure in time.

Mode 3: when the target connection fails, a connection is re-established, and the source connection failure information and the target connection failure information are transmitted to the network side via the re-established connection.

It can be understood that when the target connection fails, the connection may be re-established, and the source connection failure information and the target connection failure information are transmitted to the network side via the re-established connection, so as to inform the network side of the source connection failure and the target connection failure in time.

It can be understood that after the source connection is released, the terminal device may receive the multicast broadcast service data from the target cell via the target connection, and stop receiving the multicast broadcast service data from the source cell via the source connection.

According to the method for receiving multicast broadcast service data of an embodiment of the present disclosure, the terminal device may release the source connection, so as to close the target connection between the terminal device and the source cell in time.

FIG. 6 is a schematic flow diagram of another method for receiving multicast broadcast service data provided by an embodiment of the present disclosure, which is performed by a network-side device. As shown in FIG. 6, the method for receiving multicast broadcast service data includes the following step S601.

In S601, first indication information is transmitted to a terminal device, where the first indication information is used for instructing the terminal device to establish a source connection with a source cell and a target connection with a target cell, to receive multicast broadcast service data from the source cell via the source connection, and to receive multicast broadcast service data from the target cell via the target connection.

It is to be noted that the performing subject of the embodiment of the present disclosure may be a source network node (Source Node) in a network-side device.

In some examples, the multicast broadcast service information may be transmitted to the terminal device, the multicast broadcast service information including a multicast broadcast service identity.

In some examples, the first indication information is indication information for a multicast broadcast service.

In some examples, the source connection uses a unicast mode and/or a multicast mode, and the target connection uses a unicast mode and/or a multicast mode.

In some examples, before transmitting first indication information to the terminal device, the method further includes: transmitting request information to a target network node (Target Node), the request information including request indication information, and the request indication information being used for requesting the establishment of the source connection and the target connection. Therefore, the request information may be transmitted to the target network node so as to request the establishment of the source connection and the target connection.

In some examples, the request information further includes multicast broadcast service information, the multicast broadcast service information includes a multicast broadcast service identity, and the first indication information is indication information for multicast broadcast service.

In some examples, the reception configuration information of the source connection may be transmitted to the target network node, the reception configuration information of the source connection including reception in a unicast mode and/or reception in a multicast mode. Therefore, the target network node may be informed of the reception configuration information of the source connection.

In some examples, the first indication information fed back by the target network node according to the request information may be further received. For example, multicast broadcast service information fed back by the target network node according to the request information may be received, the multicast broadcast service information includes a multicast broadcast service identity, and the first indication information is indication information for the multicast broadcast service.

In some examples, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In some examples, the multicast broadcast service information further includes at least one of: identity of the source cell, or identity of the target cell.

It is to be noted that the description of the above-mentioned method for receiving multicast broadcast service data as shown in FIGS. 1-5 is further applicable to the method for receiving multicast broadcast service data in the embodiment, which will not be repeated herein.

The method for receiving multicast broadcast service data according to an embodiment of the present disclosure transmits the first indication information to the terminal device, the first indication information being used for indicating to the terminal device to establish the source connection with the source cell and the target connection with the target cell; receives the multicast broadcast service data from the source cell via the source connection; and receives the multicast broadcast service data from the target cell via the target connection. Therefore, the network-side device may transmit the first indication information to the terminal device, so that the terminal device establishes the source connection with the source cell and the target connection with the target cell according to the first indication information, receives the multicast broadcast service data from the source cell via the source connection, and receives the multicast broadcast service data from the target cell via the target connection. Therefore, the problem of the receiving delay of the multicast broadcast service data generated during moving can be solved. In addition, the terminal device can simultaneously establish connections with the source cell and the target cell, and can still be connected to the other cell under the condition of the connection failure of one cell, thereby improving the reliability of transferring service data.

FIG. 7 is a schematic flow diagram of another method for receiving multicast broadcast service data provided by an embodiment of the present disclosure, which is performed by a network-side device. As shown in FIG. 7, the method for receiving multicast broadcast service data includes the following steps: S701-S702.

In S701, the request information transmitted by the source network node is received.

In S702, first indication information is transmitted to a terminal device according to the request information, where the first indication information is used for instructing the terminal device to establish a source connection with a source cell and a target connection with a target cell, to receive multicast broadcast service data from the source cell via the source connection, and to receive the multicast broadcast service data from the target cell via the target connection.

It is to be noted that the performing subject of the embodiment of the present disclosure may be a target network node (Target Node) in a network-side device.

In some examples, the multicast broadcast service information may be transmitted to the terminal device via the source network node according to the request information, the multicast broadcast service information including a multicast broadcast service identity.

In some examples, the first indication information is indication information for a multicast broadcast service.

In some examples, the source connection uses a unicast mode and/or a multicast mode, and the target connection uses a unicast mode and/or a multicast mode.

In some examples, the request information includes request indication information, and the request indication information is used for requesting the establishment of the source connection and the target connection.

In some examples, the request information further includes multicast broadcast service information, the multicast broadcast service information includes a multicast broadcast service identity, and the first indication information is indication information for multicast broadcast service.

In some examples, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In some examples, the multicast broadcast service information further includes at least one of: the identity of the source cell, or the identity of the target cell.

In some examples, the reception configuration information of the source connection, which is transmitted by the source network node, may be received, and the reception configuration information of the source connection includes reception in a unicast mode and/or reception in a multicast mode.

In some examples, the second indication information may be transmitted to the terminal device, the second indication information being used for indicating to the terminal device to release the source connection.

It is to be noted that the description of the above-mentioned method for receiving multicast broadcast service data as shown in FIGS. 1-6 is further applicable to the method for receiving multicast broadcast service data in the embodiment, which will not be repeated herein.

The method for receiving multicast broadcast service data according to the embodiment of the present disclosure receives the request information transmitted by the source network node, transmits the first indication information to the terminal device via the source network node according to the request information, the first indication information being used for indicating to the terminal device to establish the source connection with the source cell and the target connection with the target cell, to receive the multicast broadcast service data from the source cell via the source connection, and to receive the multicast broadcast service data from the target cell via the target connection. Therefore, the network-side device may transmit the first indication information to the terminal device via the source network node according to the request information, so that the terminal device establishes the source connection with the source cell and the target connection with the target cell according to the first indication information, receives the multicast broadcast service data from the source cell via the source connection, and receives the multicast broadcast service data from the target cell via the target connection, which can solve the problem of the receiving delay of the multicast broadcast service data generated during moving. In addition, the terminal device can simultaneously establish connections with the source cell and the target cell, and can still be connected to the other cell under the condition of the connection failure of one cell, thereby improving the reliability of receiving service data.

Corresponding to the method for receiving multicast broadcast service data provided by the above embodiments, the present disclosure further provides an apparatus for receiving multicast broadcast service data, which is applied to a terminal device. Since the apparatus for receiving multicast broadcast service data provided in the embodiment of the present disclosure corresponds to the method for receiving multicast broadcast service data provided in the embodiments of FIGS. 1-5, the implementations of the method for receiving multicast broadcast service data are also applicable to the apparatus for receiving multicast broadcast service data provided in the present embodiment, which will not be described in detail in the present embodiment. FIG. 8 is a structural schematic diagram of the apparatus for receiving multicast broadcast service data disclosed according to the present disclosure.

As shown in FIG. 8, the apparatus 800 for receiving multicast broadcast service data includes a receiving module 801, where the receiving module 801 is used for receiving first indication information transmitted by the network side, the first indication information being used for establishing a source connection between a terminal device and a source cell and a target connection between the terminal device and a target cell;

the receiving module 801 is further used for receiving the multicast broadcast service data from the source cell via the source connection; and the receiving module 801 is further used for receiving the multicast broadcast service data from the target cell via the target connection.

In one embodiment of the present disclosure, the receiving module 801 is further used for receiving multicast broadcast service information transmitted by the network side, the multicast broadcast service information including a multicast broadcast service identity.

In one embodiment of the present disclosure, the first indication information is indication information for multicast broadcast service.

In one embodiment of the present disclosure, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In one embodiment of the present disclosure, the multicast broadcast service information further includes at least one of: the identity of the source cell; or the identity of the target cell.

In one embodiment of the present disclosure, the source connection uses a unicast mode and/or a multicast mode, and the target connection uses a unicast mode and/or a multicast mode.

In one embodiment of the present disclosure, a radio bearer for receiving multicast broadcast service data includes a packet data convergence protocol entity; the apparatus further includes: a processing module used for submitting the received multicast broadcast service data in sequence to an upper protocol entity of the packet data convergence protocol entity by the packet data convergence protocol entity, according to the sequence number of the service data.

In one embodiment of the present disclosure, the apparatus further includes at least one of: a transmitting module used for transmitting the target connection failure information to the network side; a processing module used for releasing the target connection; or a receiving module 801, which is further used for receiving the multicast broadcast service data from the source cell via the source connection and stopping receiving the multicast broadcast service data from the target cell via the target connection.

In one embodiment of the present disclosure, target connection failure occurs before the receiving module receives second indication information transmitted by the network side, and the second indication information is used for instructing a release of the source connection; or target connection failure occurs before the random access between the apparatus and the target cell is successfully completed.

In one embodiment of the present disclosure, the transmitting module is further used for re-establishing a connection when the source connection fails, and transmitting the target connection failure information to the network side via the re-established connection; for re-establishing a connection when the source connection fails and transmitting the target connection failure information and source connection failure information to the network side via the re-established connection; or for transmitting the target connection failure information to the network side via the source connection.

In one embodiment of the present disclosure, the apparatus further includes: a processing module used for changing an uplink transmission path of the source connection to that of the target connection according to a first preset rule, where the source connection uses a unicast mode, and the target connection uses a unicast mode and a multicast mode; the source connection uses a unicast mode and a multicast mode, and the target connection uses a unicast mode; or the source connection uses a unicast mode and a multicast mode and the target connection uses a unicast mode and a multicast mode.

In one embodiment of the present disclosure, the processing module is further used for changing a unicast path of the source connection to a unicast path of the target connection.

In one embodiment of the present disclosure, the apparatus further includes: a transmitting module used for transmitting data receiving status information via the source connection or the target connection.

In one embodiment of the present disclosure, the transmitting module is further used for transmitting the data receiving status information via the target connection, where a trigger event for the data receiving status information includes: the terminal device triggering the change of the transmission path, the terminal device releasing the source connection, and the source connection failure; or for transmitting the data receiving status information via the source connection, where a trigger event for the data receiving status information is a target connection failure.

In one embodiment of the present disclosure, the transmitting module is further used for transmitting the data receiving status information via the target connection, where the source connection uses a unicast mode and/or a multicast mode and the target connection uses a unicast mode and a multicast mode; or the source connection uses a multicast mode and the target connection uses a unicast mode; or the source connection uses a unicast mode and a multicast mode and the target connection uses a unicast mode.

In one embodiment of the present disclosure, the transmitting module is further used for transmitting the data receiving status information via a unicast path of the target connection, where the source connection uses a unicast mode and/or a multicast mode, and the target connection uses a unicast mode and a multicast mode.

In one embodiment of the present disclosure, the transmitting module is further used for transmitting the data receiving status information via the source connection, where the source connection uses a unicast mode and a multicast mode and the target connection uses a unicast mode and/or a multicast mode; or the source connection uses a unicast mode and the target connection uses a multicast mode; or the source connection uses a unicast mode and the target connection uses a unicast mode and a multicast mode.

In one embodiment of the present disclosure, the transmitting module is further used for transmitting the data receiving status information via a unicast path of the source connection, where the source connection uses a unicast mode and a multicast mode, and the target connection uses a unicast mode and/or a multicast mode.

In one embodiment of the present disclosure, the apparatus further includes a processing module used for releasing the source connection.

In one embodiment of the present disclosure, the receiving module 801 is further used for receiving second indication information transmitted by the network side, the second indication information being used for indicating a release of the source connection.

In one embodiment of the present disclosure, the processing module is further used for releasing the source connection according to the third preset rule.

In one embodiment of the present disclosure, the third preset rule includes successful completion of the random access between the terminal device and the target cell or the source connection failure.

In one embodiment of the present disclosure, the type of the source connection failure is a radio link failure.

In one embodiment of the present disclosure, the source connection fails, and the transmitting module is further used for transmitting source connection failure information to the network side.

In one embodiment of the present disclosure, the transmitting module is further used for transmitting the source connection failure information to the network side via the target connection, or for re-establishing the connection when the target connection fails and transmitting the source connection failure information to the network side via the re-established connection.

The apparatus for receiving multicast broadcast service data according to the embodiment of the present disclosure receives the first indication information transmitted by the network side, the first indication information being used for establishing the source connection between the terminal device and the source cell and the target connection between the terminal device and the target cell; receives the multicast broadcast service data from the source cell via the source connection; and receives the multicast broadcast service data from the target cell via the target connection. Therefore, the terminal device can receive the multicast broadcast service data from the source cell via the source connection, and can further receive the multicast broadcast service data from the target cell via the target connection, so that the terminal device can simultaneously receive the multicast broadcast service data via the source cell and the target cell, which can solve the problem of the receiving delay of the multicast broadcast service data generated during moving. In addition, the terminal device can simultaneously establish connections with the source cell and the target cell, and can still be connected to the other cell under the condition of the connection failure of one cell, thereby improving the reliability of receiving service data.

Corresponding to the method for receiving multicast broadcast service data provided by the above embodiments, the present disclosure further provides an apparatus for receiving multicast broadcast service data, which is applied to a network-side device. Since the apparatus for receiving multicast broadcast service data corresponds to the method for receiving multicast broadcast service data provided in FIG. 6, the implementations of the method for receiving multicast broadcast service data are also applicable to the apparatus for receiving multicast broadcast service data provided by the embodiments, and will not be described in detail in the embodiment. FIG. 9 is a structural schematic diagram of the apparatus for receiving multicast broadcast service data disclosed according to the present disclosure.

As shown in FIG. 9, the apparatus 900 for receiving multicast broadcast service data includes a transmitting module 901, where a transmitting module 901 is used for transmitting first indication information to a terminal device, where the first indication information is used for instructing the terminal device to establish a source connection with a source cell and a target connection with a target cell, to receive multicast broadcast service data from the source cell via the source connection, and to receive the multicast broadcast service data from the target cell via the target connection.

In one embodiment of the present disclosure, the transmitting module 901 is further used for transmitting multicast broadcast service information to the terminal device, the multicast broadcast service information including a multicast broadcast service identity.

In one embodiment of the present disclosure, the first indication information is indication information for multicast broadcast service.

In one embodiment of the present disclosure, the source connection uses a unicast mode and/or a multicast mode, and the target connection uses a unicast mode and/or a multicast mode.

In one embodiment of the present disclosure, the transmitting module 901 is further used for transmitting request information to a target network node before transmitting first indication information to a terminal device, the request information including request indication information, and the request indication information being used for requesting establishment of the source connection and the target connection.

In one embodiment of the present disclosure, the request information further includes multicast broadcast service information, the multicast broadcast service information includes a multicast broadcast service identity, and the first indication information is indication information for multicast broadcast service.

In one embodiment of the present disclosure, the transmitting module 901 is further used for transmitting reception configuration information of the source connection to the target network node, the reception configuration information of the source connection including reception in a unicast mode and/or reception in a multicast mode.

In one embodiment of the present disclosure, the apparatus further includes: a receiving module used for receiving the first indication information fed back by the target network node according to the request information.

In one embodiment of the present disclosure, the receiving module is further used for receiving multicast broadcast service information fed back by the target network node according to the request information, the multicast broadcast service information including a multicast broadcast service identity, and the first indication information being indication information for multicast broadcast service.

In one embodiment of the present disclosure, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In one embodiment of the present disclosure, the multicast broadcast service information further includes at least one of: the identity of the source cell, or the identity of the target cell.

The apparatus for receiving multicast broadcast service data of an embodiment of the present disclosure transmits first indication information to a terminal device, the first indication information being used for instructing the terminal device to establish a source connection with a source cell and a target connection with a target cell; to receive multicast broadcast service data from the source cell via the source connection, and to receive the multicast broadcast service data from the target cell via the target connection. Therefore, the network-side device can transmit the first indication information to the terminal device, so that the terminal device establishes the source connection with the source cell and the target connection with the target cell according to the first indication information, receives the multicast broadcast service data from the source cell via the source connection, and receives the multicast broadcast service data from the target cell via the target connection. Therefore, the problem of the receiving delay of the multicast broadcast service data generated during moving can be solved. In addition, the terminal device can simultaneously establish connections with the source cell and the target cell, and can still be connected to the other cell under the condition of the connection failure of one cell, thereby improving the reliability of transferring service data.

Figure 10:
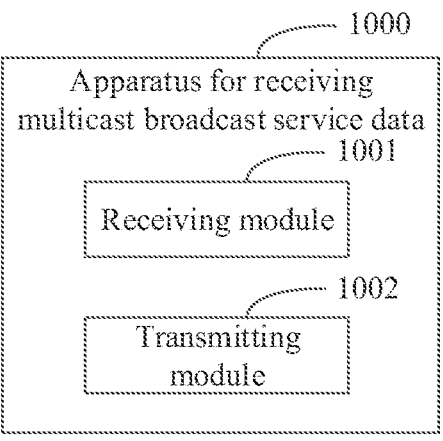
FIG. 10 is a schematic structural diagram of another apparatus for receiving multicast broadcast service according to an embodiment of the present disclosure.

Corresponding to the method for receiving multicast broadcast service data provided by the above embodiments, the present disclosure further provides an apparatus for receiving multicast broadcast service data, which is applied to a network-side device. Since the apparatus for receiving multicast broadcast service data corresponds to the method for receiving multicast broadcast service data provided in FIG. 7, the implementations of the method for receiving multicast broadcast service data are also applicable to the apparatus for receiving multicast broadcast service data provided by the embodiments, and will not be described in detail in the embodiment. FIG. 10 is a structural schematic diagram of the apparatus for receiving multicast broadcast service data disclosed according to the present disclosure.

As shown in FIG. 10, the apparatus 1000 for receiving multicast broadcast service data includes a receiving module 1001 and a transmitting module 1002, where the receiving module 1001 is used for receiving request information transmitted by a source network node; and the transmitting module 1002 is used for transmitting first indication information to a terminal device according to the request information, the first indication information being used for instructing the terminal device to establish a source connection with a source cell and a target connection with a target cell, to receive multicast broadcast service data from the source cell via the source connection, and to receive the multicast broadcast service data from the target cell via the target connection.

In one embodiment of the present disclosure, the transmitting module 1002 is further used for transmitting multicast broadcast service information to the terminal device via the source network node, the multicast broadcast service information including a multicast broadcast service identity.

In one embodiment of the present disclosure, the first indication information is indication information for multicast broadcast service.

In one embodiment of the present disclosure, the source connection uses a unicast mode and/or a multicast mode, and the target connection uses a unicast mode and/or a multicast mode.

In one embodiment of the present disclosure, the request information includes request indication information, and the request indication information is used for requesting the establishment of the source connection and the target connection.

In one embodiment of the present disclosure, the request information further includes multicast broadcast service information, the multicast broadcast service information includes a multicast broadcast service identity, and the first indication information is indication information for multicast broadcast service.

In one embodiment of the present disclosure, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In one embodiment of the present disclosure, the multicast broadcast service information further includes at least one of: identity of the source cell; or identity of the target cell.

In one embodiment of the present disclosure, the receiving module 1001 is further used for receiving the reception configuration information of the source connection transmitted by the source network node, the reception configuration information of the source connection including reception in a unicast mode and/or reception in a multicast mode.

In one embodiment of the present disclosure, the transmitting module 1002 is further used for transmitting second indication information to the terminal device, the second indication information being used for indicating to the terminal device to release the source connection.

The apparatus for receiving multicast broadcast service data of the embodiment of the present disclosure receives the request information transmitted by the source network node; transmits the first indication information to the terminal device via the source network node according to the request information, the first indication information being used for establishing the source connection between the terminal device and the source cell and the target connection between the terminal device and the target cell; and receives the multicast broadcast service data from the source cell via the source connection and receives from the multicast broadcast service data from the target cell via the target connection. Therefore, the network-side device can transmit the first indication information to the terminal device via the source network node according to the request information, so that the terminal device establishes the source connection with the source cell and the target connection with the target cell according to the first indication information, and receives the multicast broadcast service data from the source cell via the source connection and receives the multicast broadcast service data from the target cell via the target connection, which can solve the problem of the receiving delay of the multicast broadcast service data generated during moving. In addition, the terminal device can simultaneously establish connections with the source cell and the target cell, and can still be connected to the other cell under the condition of the connection failure of one cell, thereby improving the reliability of receiving service data.

According to an embodiment of the present disclosure, the present disclosure further provides a terminal device, including the apparatus 800 for receiving multicast broadcast service provided by an embodiment of the present disclosure.

According to an embodiment of the present disclosure, the present disclosure further provides a network-side device, including the apparatus 900 for receiving multicast broadcast service provided by an embodiment of the present disclosure, or the apparatus 1000 for receiving multicast broadcast service provided by an embodiment of the present disclosure.

According to an embodiment of the present disclosure, the present disclosure further provides a communication apparatus, including: at least one processor, and a memory communicatively connected with the at least one processor, where the memory stores instructions executable by the at least one processor, and when executed by the at least one processor, the instructions cause the at least one processor to perform the method for receiving multicast broadcast service data as described in FIGS. 1-5.

According to an embodiment of the present disclosure, the present disclosure further provides another communication apparatus, including: at least one processor, and a memory communicatively connected with the at least one processor, where the memory stores instructions executable by the at least one processor, and when executed by the at least one processor, the instructions cause the at least one processor to perform the method for receiving multicast broadcast service data as described in FIGS. 6-7.

According to an embodiment of the present disclosure, the present disclosure further provides a non-transitory computer-readable storage medium storing computer instructions, where the computer instructions are used for causing the computer to perform the method for receiving multicast broadcast service data as described in FIGS. 1-5.

According to an embodiment of the present disclosure, the present disclosure further provides a non-transitory computer-readable storage medium storing computer instructions, where the computer instructions are used for causing the computer to perform the method for receiving multicast broadcast service data as described in FIGS. 6-7.

According to an embodiment of the present disclosure, the present disclosure further provides a computer program product, including a computer program, where when the computer program is executed by a processor, the method for receiving multicast broadcast service data as described in FIGS. 1-5 is implemented.

According to an embodiment of the present disclosure, the present disclosure further provides another computer program product, including a computer program, where when the computer program is executed by a processor, the method for receiving multicast broadcast service data as described in FIGS. 6-7 is implemented.

Figure 11:
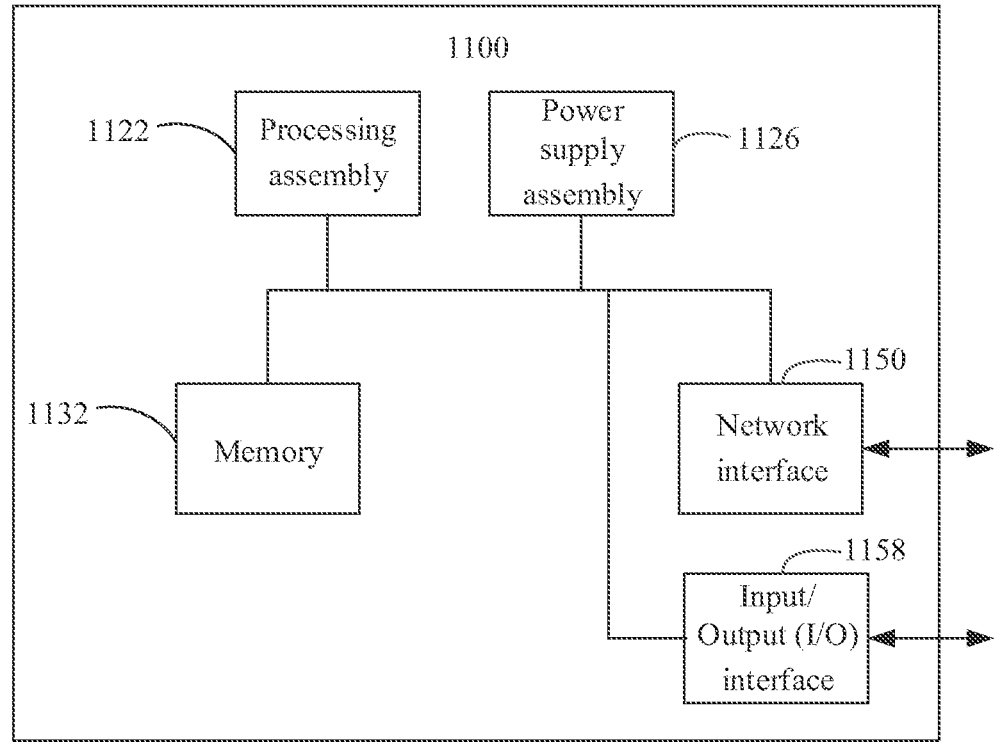
FIG. 11 is a schematic structural diagram of a network-side device provided by an embodiment of the present disclosure.

As shown in FIG. 11, it is a schematic structural diagram of a network-side device provided by an embodiment of the present disclosure. The network-side device may be a base station. Referring to FIG. 11, the network-side device 1100 includes a processing assembly 1122, which further includes at least one processor, and a memory resource represented by the memory 1132 and used for storing instructions that may be executed by the processing assembly 1122, such as applications. The applications stored in the memory 1132 may include one or more modules, each corresponding to a set of instructions. In addition, the processing assembly 1122 is used for executing instructions, to perform any methods applied to the network-side device of the above methods, such as the methods as shown in FIGS. 6-7.

The network-side device 1100 may further include a power supply assembly 1126 used for executing power supply management of the network-side device 1100, a wired or wireless network interface 1150 used for connecting the network-side device 1100 to a network, and an input/output (I/O) interface 1158. The network-side device 1100 may operate based on an operating system stored in the memory 1132, such as Windows Server™, Mac OS X™, Unix™, Linux™, FreeBSD™, or the like.

Figure 12:
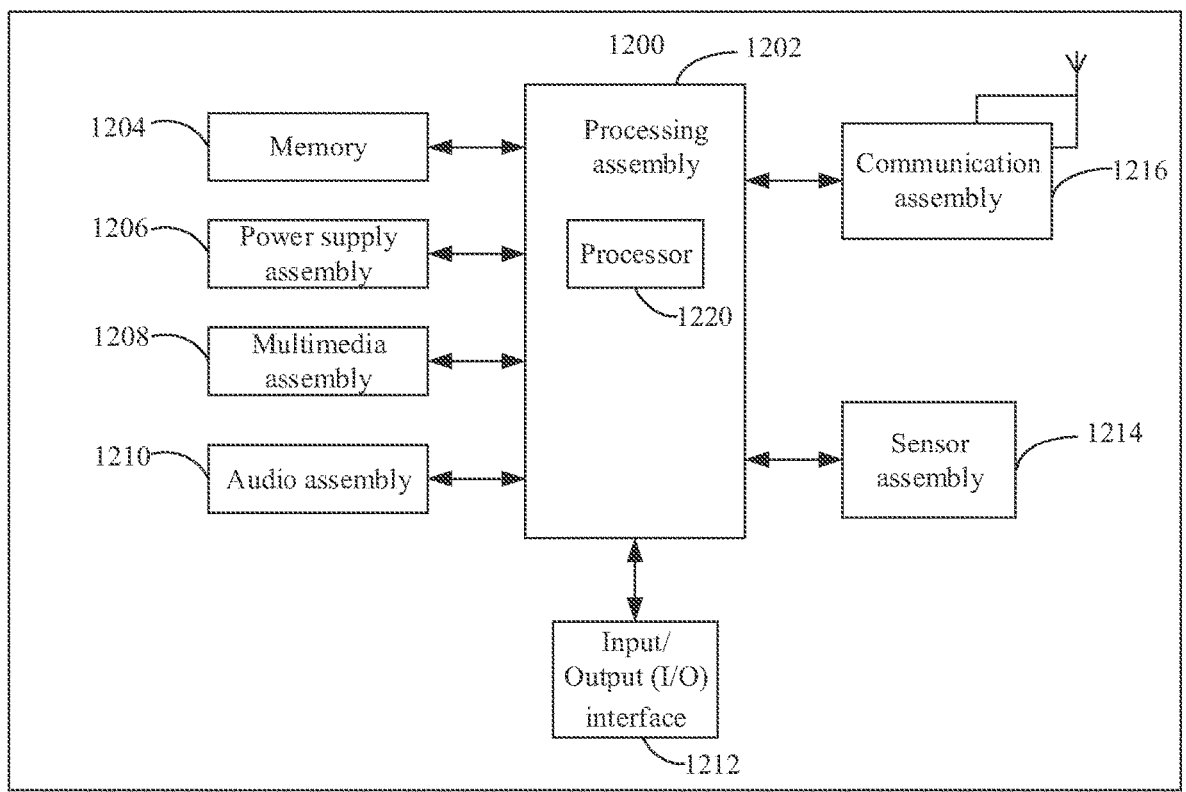
FIG. 12 is a schematic structural diagram of a terminal device provided by an embodiment of the present disclosure.

FIG. 12 is a block diagram of a terminal device 1200 provided by an embodiment of the present disclosure. For example, the terminal device 1200 may be a mobile phone, a computer, a digital broadcasting terminal device, a messaging device, a game console, a tablet device, a medical device, a fitness device, a personal digital assistant, etc.

Referring to FIG. 12, the terminal device 1200 may include at least one of the following assemblies: a processing assembly 1202, a memory 1204, a power supply assembly 1206, a multimedia assembly 1208, an audio assembly 1210, an input/output (I/O) interface 1212, a sensor assembly 1214, or a communication assembly 1216.

The processing assembly 1202 generally controls an overall operation of the terminal device 1200, such as operations associated with display, a telephone call, a data communication, a camera operation, and a recording operation. The processing assembly 1202 may include at least one processor 1220 to execute instructions to complete all or part of the steps of the foregoing methods. In addition, the processing assembly 1202 may include at least one module to facilitate interaction between the processing assembly 1202 and other assemblies. For example, the processing assembly 1202 may include a multimedia module to facilitate interaction between the multimedia assembly 1208 and the processing assembly 1202.

The memory 1204 is used for storing various types of data to support the operations at the terminal device 1200. Examples of these data include instructions for any application or method operated on the terminal device 1200, contact data, phone book data, messages, pictures, videos, and the like. The memory 1204 may be implemented by any type of volatile or non-volatile storage device or a combination thereof, such as a static random access memory (SRAM), an electrically erasable programmable read-only memory (EEPROM), an erasable, programmable read-only memory (EPROM), a programmable read-only memory (PROM), a read-only memory (ROM), a magnetic memory, a flash memory, a magnetic disk or an optical disk.

The power supply assembly 1206 provides power for various assemblies of the terminal device 1200. The power supply assembly 1206 may include a power management system, at least one power source, and other assemblies associated with power generation, management, and distribution of the terminal device 1200.

The multimedia assembly 1208 includes a screen for providing an output interface between the terminal device 1200 and a user. In some embodiments, the screen may include a liquid crystal display (LCD) and a touch panel (TP). If the screen includes a touch panel, the screen may be realized as a touch screen to receive input signals from the user. The touch panel includes at least one touch sensor to sense touch, slide, and gestures on the touch panel. The touch sensor may sense a boundary of a touch or slide operation, and detect wake-up time and pressure related to the touch or slide operation. In some embodiments, the multimedia assembly 1208 includes a front camera and/or a rear camera. When the terminal device 1200 is in an operation mode, such as a shooting mode or a video mode, a front camera and/or a rear camera may receive external multimedia data. Each front or rear camera may be a fixed optical lens system or have a focal length and optical zoom capability.

The audio assembly 1210 is used for outputting and/or inputting an audio signal. For example, the audio assembly 1210 includes a microphone (MIC), which is used for receiving external audio signals when the terminal device 1200 is in an operation mode, such as a call mode, a recording mode, and a voice recognition mode. The received audio signal may be further stored in the memory 1204 or transmitted by the communication assembly 1216. In some embodiments, the audio assembly 1210 further includes at least one loudspeaker, used for outputting audio signals.

The I/O interface 1212 provides an interface between the processing assembly 1202 and a peripheral interface module, and the peripheral interface module may be a keyboard, a click wheel, a button, etc. These buttons may include, but are not limited to, a home button, a volume button, a start button, and a lock button.

The sensor assembly 1214 includes at least one sensor for providing various aspects of status assessment for the terminal device 1200. For example, the sensor assembly 1214 may detect an on/off state of the device 1200, and relative positioning of assemblies, for example, the assemblies are a display and a keypad of the terminal device 1200. The sensor assembly 1214 may further detect a change of position of the terminal device 1200 or one assembly of the terminal device 1200, whether or not the user touches the terminal device 1200, an orientation or acceleration/deceleration of the terminal device 1200, and a temperature variation of terminal device 1200. The sensor assembly 1214 may include a proximity sensor, configured to detect the presence of a nearby object in the absence of any physical contact. The sensor assembly 1214 may further include a light sensor, such as a CMOS or CCD image sensor, for use in imaging applications. In some embodiments, the sensor assembly 1214 may further include an acceleration sensor, a gyroscope sensor, a magnetic sensor, a pressure sensor, or a temperature sensor.

The communication assembly 1216 is used for facilitating wired or wireless communication between the terminal device 1200 and other devices. The terminal device 1200 may access a wireless network based on communication standards, such as WiFi, 2G, 3G, or a combination thereof. In an illustrative embodiment, the communication assembly 1216 receives broadcast signals or broadcast-associated information from an external broadcast management system through a broadcast channel. In an illustrative embodiment, the communication assembly 1216 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the terminal device 1200 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronic assemblies to perform the methods as shown in FIGS. 1-5.

In an illustrative embodiment, a non-transitory computer-readable storage medium including instructions is further provided, such as the memory 1204 including the instructions executable by the processor 1220 of the terminal device 1200 to complete the above methods. For example, the non-transitory computer-readable storage medium may be a ROM, a random access memory (RAM), a CD-ROM, a magnetic tape, a floppy disk, an optical data storage device, etc.

Those skilled in the art would readily conceive of other implementations of the present invention after considering the specification and practicing the invention disclosed here. The present disclosure is intended to cover any variations, uses, or adaptive changes of the present disclosure. These variations, uses, or adaptive changes follow the general principle of the present disclosure and include common general knowledge or conventional technical means in the technical field that are not disclosed in the present disclosure. The specification and embodiments are considered as illustrative only, and the true scope and spirit of the disclosure are indicated by the following claims.

It should be understood that the present disclosure is not limited to the precise structure described above and shown in the drawings, and various modifications and changes can be made without departing from its scope. The scope of the present disclosure is only limited by the appended claims.

An embodiment of the first aspect of the present disclosure discloses a method for receiving multicast broadcast service data, which is performed by a terminal device, and the method includes: receiving first indication information transmitted by a network side, the first indication information being used for establishing a source connection between the terminal device and a source cell and a target connection between the terminal device and a target cell; receiving multicast broadcast service data from the source cell via the source connection; and receiving the multicast broadcast service data from the target cell via the target connection.

In one embodiment of the present disclosure, the method further includes: receiving multicast broadcast service information transmitted by the network side, the multicast broadcast service information including a multicast broadcast service identity.

In one embodiment of the present disclosure, the first indication information is indication information for multicast broadcast service.

In one embodiment of the present disclosure, the multicast broadcast service identity includes at least one of: the temporary mobile group identity; the multicast broadcast service session identity; the multicast broadcast service flow identity; the multicast broadcast service bearer identity; the multicast broadcast service logical channel identity, the radio link control entity identity for the multicast broadcast service; or the multicast scheduling identity.

In one embodiment of the present disclosure, the multicast broadcast service information further includes at least one of: the identity of the source cell, or the identity of the target cell.

In one embodiment of the present disclosure, the source connection uses a unicast mode and/or a multicast mode, and the target connection uses a unicast mode and/or a multicast mode.

In one embodiment of the present disclosure, a radio bearer for receiving multicast broadcast service data in the terminal device includes a packet data convergence protocol entity; the method further includes: submitting the received multicast broadcast service data in sequence to an upper protocol entity of the packet data convergence protocol entity according to a sequence number of the service data by the packet data convergence protocol entity.

In one embodiment of the present disclosure, the method further includes at least one of: transmitting the target connection failure information to the network side; releasing the target connection; or receiving the multicast broadcast service data from the source cell via the source connection, and stopping receiving the multicast broadcast service data from the target cell via the target connection.

In one embodiment of the present disclosure, target connection failure occurs before the terminal device receives second indication information transmitted by the network side, and the second indication information is used for instructing the terminal device to release the source connection; or target connection failure occurs before the random access between the terminal device and the target cell is successfully completed.

In one embodiment of the present disclosure, transmitting the target connection failure information to the network side includes: re-establishing the connection when the source connection fails and transmitting the target connection failure information to the network side via the re-established connection; or re-establishing the connection when the source connection fails and transmitting the target connection failure information and source connection failure information to the network side via the re-established connection; or transmitting the target connection failure information to the network side via the source connection.

In one embodiment of the present disclosure, the method further includes: changing an uplink transmission path of the source connection to that of the target connection according to a first preset rule, where the source connection uses a unicast mode, and the target connection uses a unicast mode and a multicast mode; or the source connection uses a unicast mode and a multicast mode, and the target connection uses a unicast model; or the source connection uses a unicast mode and a multicast mode, and the target connection uses a unicast mode and a multicast mode.

In one embodiment of the present disclosure, changing the uplink transmission path from the source connection to that of the target connection includes changing a unicast path of the source connection to a unicast path of the target connection.

In one embodiment of the present disclosure, the method further includes transmitting data receiving status information via the source connection or the target connection, according to a second preset rule.

In one embodiment of the present disclosure, transmitting data receiving status information via the source connection or the target connection, according to the second preset rule includes: transmitting the data receiving status information via the target connection, where a trigger event for the data receiving status information includes: the terminal device triggering a change of a transmission path, the terminal device releasing the source connection, and the source connection failure; or transmitting the data receiving status information via the source connection, where a trigger event for the data receiving status information is a target connection failure.

In one embodiment of the present disclosure, transmitting the data receiving status information via the target connection includes: transmitting the data receiving status information via the target connection, where the source connection uses a unicast mode and/or a multicast mode, and the target connection uses a unicast mode and a multicast mode; or the source connection uses a multicast mode, and the target connection uses a unicast mode; or the source connection uses a unicast mode and a multicast mode, and the target connection uses a unicast mode.

In one embodiment of the present disclosure, transmitting the data receiving status information via the target connection includes: transmitting the data receiving status information via a unicast path of the target connection, where the source connection uses a unicast mode and/or a multicast mode, and the target connection uses a unicast mode and a multicast mode.

In one embodiment of the present disclosure, transmitting the data receiving status information via the source connection includes: transmitting the data receiving status information via the source connection, where the source connection uses a unicast mode and a multicast mode, and the target connection uses a unicast mode and/or a multicast mode; or the source connection uses a unicast mode, and the target connection uses a multicast mode; or the source connection uses a unicast mode, and the target connection uses a unicast mode and a multicast mode.

In one embodiment of the present disclosure, transmitting the data receiving status information via the source connection includes: transmitting the data receiving status information via a unicast path of the source connection, where the source connection uses a unicast mode and a multicast mode, and the target connection uses a unicast mode and/or a multicast mode.

In one embodiment of the present disclosure, the method further including releasing the source connection.

In one embodiment of the present disclosure, before releasing the source connection, the method further includes: receiving second indication information transmitted by the network side, the second indication information being used for indicating a release of the source connection.

In one embodiment of the present disclosure, releasing the source connection includes: releasing the source connection according to a third preset rule.

In one embodiment of the present disclosure, the third preset rule includes successful completion of the random access between the terminal device and the target cell or the source connection failure.

In one embodiment of the present disclosure, the type of the source connection failure is a radio link failure.

In one embodiment of the present disclosure, the source connection fails, and the method further includes transmitting source connection failure information to the network side.

In one embodiment of the present disclosure, transmitting the source connection failure information to the network side includes: transmitting the source connection failure information to the network side via the target connection; or re-establishing the connection when the target connection fails, and transmitting the source connection failure information to the network side via the re-established connection.

An embodiment of the second aspect of the present disclosure discloses a method for receiving multicast broadcast service data, which is applied to the network-side device, and the method includes: transmitting first indication information to a terminal device, where the first indication information is used for instructing the terminal device to establish a source connection with a source cell and a target connection with a target cell, to receive multicast broadcast service data from the source cell via the source connection, and to receive the multicast broadcast service data from the target cell via the target connection.

In one embodiment of the present disclosure, the method further includes: transmitting multicast broadcast service information to the terminal device, where the multicast broadcast service information includes a multicast broadcast service identity.

In one embodiment of the present disclosure, the first indication information is indication information for multicast broadcast service.

In one embodiment of the present disclosure, the source connection uses a unicast mode and/or a multicast mode, and the target connection uses a unicast mode and/or a multicast mode.

In one embodiment of the present disclosure, before transmitting first indication information to the terminal device, the method further includes: transmitting request information to a target network node, where the request information includes request indication information, and the request indication information is used for requesting establishment of the source connection and the target connection.

In one embodiment of the present disclosure, the request information further includes multicast broadcast service information, the multicast broadcast service information includes a multicast broadcast service identity, and the first indication information is indication information for multicast broadcast service.

In one embodiment of the present disclosure, the method further includes: transmitting the reception configuration information of the source connection to the target network node, where the reception configuration information of the source connection includes reception in a unicast mode and/or reception in a multicast mode.

In one embodiment of the present disclosure, the method further includes: receiving the first indication information fed back by the target network node according to the request information.

In one embodiment of the present disclosure, the method further includes: receiving multicast broadcast service information fed back by the target network node according to the request information, where the received multicast broadcast service information includes a multicast broadcast service identity, and the first indication information is indication information for multicast broadcast service.

In one embodiment of the present disclosure, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In one embodiment of the present disclosure, the multicast broadcast service information further includes at least one of: the identity of the source cell, or the identity of the target cell.

An embodiment of the third aspect of the present disclosure discloses a method for receiving multicast broadcast service data, which is applied to the network-side device, and the method includes: receiving request information transmitted by a source network node; transmitting first indication information to a terminal device via the source network node according to the request information, where the first indication information is used for instructing the terminal device to establish a source connection with a source cell and a target connection with a target cell, to receive multicast broadcast service data from the source cell via the source connection, and to receive multicast broadcast service data from the target cell via the target connection.

In one embodiment of the present disclosure, the method further includes: transmitting multicast broadcast service information to the terminal device via the source network node according to the request information, where the multicast broadcast service information includes a multicast broadcast service identity.

In one embodiment of the present disclosure, the first indication information is indication information for multicast broadcast service.

In one embodiment of the present disclosure, the source connection uses a unicast mode and/or a multicast mode, and the target connection uses a unicast mode and/or a multicast mode.

In one embodiment of the present disclosure, the request information includes request indication information, and the request indication information is used for requesting the establishment of the source connection and the target connection.

In one embodiment of the present disclosure, the request information further includes multicast broadcast service information, the multicast broadcast service information includes a multicast broadcast service identity, and the first indication information is indication information for multicast broadcast service.

In one embodiment of the present disclosure, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In one embodiment of the present disclosure, the multicast broadcast service information further includes at least one of: identity of the source cell, or identity of the target cell.

In one embodiment of the present disclosure, the method further includes: receiving the reception configuration information of the source connection, transmitted by the source network node, where the reception configuration information of the source connection includes reception in a unicast mode and/or reception in a multicast mode.

In one embodiment of the present disclosure, the method further includes: transmitting second indication information to the terminal device, where the second indication information is used for indicating to the terminal device to release the source connection.

An embodiment of the fourth aspect of the present disclosure discloses an apparatus for receiving multicast broadcast service, the apparatus including: a receiving module used for receiving first indication information transmitted by a network side, where the first indication information is used for establishing a source connection between the terminal device and a source cell and a target connection between the terminal device and a target cell; the receiving module is further used for receiving multicast broadcast service data from the source cell via the source connection, and the receiving module is further used for receiving the multicast broadcast service data from the target cell via the target connection.

In one embodiment of the present disclosure, the receiving module is further used for receiving multicast broadcast service information transmitted by the network side, the multicast broadcast service information including a multicast broadcast service identity.

In one embodiment of the present disclosure, the first indication information is indication information for multicast broadcast service.

In one embodiment of the present disclosure, the multicast broadcast service identity includes at least one of: the temporary mobile group identity; the multicast broadcast service session identity; the multicast broadcast service flow identity, the multicast broadcast service bearer identity; the multicast broadcast service logical channel identity; the radio link control entity identity for the multicast broadcast service; or the multicast scheduling identity.

In one embodiment of the present disclosure, the multicast broadcast service information further includes at least one of: the identity of the source cell, or the identity of the target cell.

In one embodiment of the present disclosure, the source connection uses a unicast mode and/or a multicast mode, and the target connection uses a unicast mode and/or a multicast mode.

In one embodiment of the present disclosure, a radio bearer for receiving multicast broadcast service data includes a packet data convergence protocol entity; the apparatus further includes: a processing module used for submitting the received multicast broadcast service data in sequence to an upper protocol entity of the packet data convergence protocol entity by the packet data convergence protocol entity, according to the sequence number of the service data.

In one embodiment of the present disclosure, the apparatus further includes at least one of: a transmitting module used for transmitting the target connection failure information to the network side; a processing module used for releasing the target connection; or a receiving module, which is further used for receiving the multicast broadcast service data from the source cell via the source connection and stopping receiving the multicast broadcast service data from the target cell via the target connection.

In one embodiment of the present disclosure, target connection failure occurs before the receiving module receives second indication information transmitted by the network side, and the second indication information is used for instructing a release of the source connection; or target connection failure occurs before the random access between the apparatus and the target cell is successfully completed.

In one embodiment of the present disclosure, the transmitting module is further used for re-establishing a connection when the source connection fails, and transmitting the target connection failure information to the network side via the re-established connection; or re-establishing a connection when the source connection fails and transmitting the target connection failure information and source connection failure information to the network side via the re-established connection; or transmitting the target connection failure information to the network side via the source connection.

In one embodiment of the present disclosure, the apparatus further includes: a processing module used for changing an uplink transmission path of the source connection to that of the target connection according to the first preset rule; where the source connection uses a unicast mode, and the target connection uses a unicast mode and a multicast mode; or the source connection uses a unicast mode and a multicast mode, and the target connection uses a unicast mode; or the source connection uses a unicast mode and a multicast mode, and the target connection uses a unicast mode and a multicast mode.

In one embodiment of the present disclosure, the processing module is further used for changing a unicast path of the source connection to a unicast path of the target connection.

In one embodiment of the present disclosure, the apparatus further includes: a transmitting module used for transmitting data receiving status information via the source connection or the target connection.

In one embodiment of the present disclosure, the transmitting module is further used for transmitting the data receiving status information via the target connection, where a trigger event for the data receiving status information includes: the terminal device triggering the change of the transmission path, the terminal device releasing the source connection, and the source connection failure; or transmitting the data receiving status information via the source connection, where a trigger event for the data receiving status information is a target connection failure.

In one embodiment of the present disclosure, the transmitting module is further used for transmitting the data receiving status information via the target connection, where the source connection uses a unicast mode and/or a multicast mode, and the target connection uses a unicast mode and a multicast mode; or the source connection uses a multicast mode, and the target connection uses a unicast mode; or the source connection uses a unicast mode and a multicast mode, and the target connection uses a unicast mode.

In one embodiment of the present disclosure, the transmitting module is further used for transmitting the data receiving status information via a unicast path of the target connection, where the source connection uses a unicast mode and/or a multicast mode, and the target connection uses a unicast mode and a multicast mode.

In one embodiment of the present disclosure, the transmitting module is further used for transmitting the data receiving status information via the source connection, where the source connection uses a unicast mode and a multicast mode, and the target connection uses a unicast mode and/or a multicast mode; or the source connection uses a unicast mode, and the target connection uses a multicast mode; or the source connection uses a unicast mode, and the target connection uses a unicast mode and a multicast mode.

In one embodiment of the present disclosure, the transmitting module is further used for transmitting the data receiving status information via a unicast path of the source connection, where the source connection uses a unicast mode and a multicast mode, and the target connection uses a unicast mode and/or a multicast mode.

In one embodiment of the present disclosure, the apparatus further includes a processing module used for releasing the source connection.

In one embodiment of the present disclosure, the receiving module is further used for receiving second indication information transmitted by the network side, the second indication information being used for indicating a release of the source connection.

In one embodiment of the present disclosure, the processing module is further used for releasing the source connection according to the third preset rule.

In one embodiment of the present disclosure, the third preset rule includes successful completion of the random access between the terminal device and the target cell or the source connection failure.

In one embodiment of the present disclosure, the type of the source connection failure is a radio link failure.

In one embodiment of the present disclosure, the source connection fails, and the transmitting module is further used for transmitting source connection failure information to the network side.

In one embodiment of the present disclosure, the transmitting module is further used for transmitting the source connection failure information to the network side via the target connection, or re-establishing the connection when the target connection fails, and transmitting the source connection failure information to the network side via the re-established connection.

An embodiment of the fifth aspect of the present disclosure discloses an apparatus for receiving multicast broadcast service data, which is applied to a network-side device, and the apparatus includes: a transmitting module used for transmitting first indication information to a terminal device, where the first indication information is used for instructing the terminal device to establish a source connection with a source cell and a target connection with a target cell, to receive multicast broadcast service data from the source cell via the source connection, and to receive the multicast broadcast service data from the target cell via the target connection.

In one embodiment of the present disclosure, the transmitting module is further used for transmitting multicast broadcast service information to the terminal device, the multicast broadcast service information including a multicast broadcast service identity.

In one embodiment of the present disclosure, the first indication information is indication information for multicast broadcast service.

In one embodiment of the present disclosure, the source connection uses a unicast mode and/or a multicast mode, and the target connection uses a unicast mode and/or a multicast mode.

In one embodiment of the present disclosure, the transmitting module is further used for transmitting request information to a target network node before transmitting first indication information to a terminal device, the request information including request indication information, and the request indication information being used for requesting establishment of the source connection and the target connection.

In one embodiment of the present disclosure, the request information further includes multicast broadcast service information, the multicast broadcast service information includes a multicast broadcast service identity, and the first indication information is indication information for multicast broadcast service.

In one embodiment of the present disclosure, the transmitting module is further used for transmitting reception configuration information of the source connection to the target network node, the reception configuration information of the source connection including reception in a unicast mode and/or reception in a multicast mode.

In one embodiment of the present disclosure, the apparatus further includes: a receiving module used for receiving the first indication information fed back by the target network node according to the request information.

In one embodiment of the present disclosure, the receiving module is further used for receiving multicast broadcast service information fed back by the target network node according to the request information, the received multicast broadcast service information including a multicast broadcast service identity, and the first indication information being indication information for multicast broadcast service.

In one embodiment of the present disclosure, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In one embodiment of the present disclosure, the multicast broadcast service information further includes at least one of: the identity of the source cell, or the identity of the target cell.

An embodiment of the sixth aspect of the present disclosure discloses an apparatus for receiving multicast broadcast service data, which is applied to a network-side device, the apparatus including: a receiving module used for receiving request information transmitted by a source network node; a transmitting module used for transmitting the request information to a terminal device via the source network node according to the request information, where the first indication information is used for instructing the terminal device to establish a source connection with a source cell and a target connection with a target cell, to receive multicast broadcast service data from the source cell via the source connection, and to receive the multicast broadcast service data from the target cell via the target connection.

In one embodiment of the present disclosure, the transmitting module is further used for transmitting multicast broadcast service information to the terminal device via the source network node, the multicast broadcast service information including a multicast broadcast service identity.

In one embodiment of the present disclosure, the first indication information is indication information for multicast broadcast service.

In one embodiment of the present disclosure, the source connection uses a unicast mode and/or a multicast mode, and the target connection uses a unicast mode and/or a multicast mode.

In one embodiment of the present disclosure, the request information includes request indication information, and the request indication information is used for requesting the establishment of the source connection and the target connection.

In one embodiment of the present disclosure, the request information further includes multicast broadcast service information, the multicast broadcast service information includes a multicast broadcast service identity, and the first indication information is indication information for multicast broadcast service.

In one embodiment of the present disclosure, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In one embodiment of the present disclosure, the multicast broadcast service information further includes at least one of: the identity of the source cell, or the identity of the target cell.

In one embodiment of the present disclosure, the receiving module is further used for receiving the reception configuration information of the source connection transmitted by the source network node, the reception configuration information of the source connection including reception in a unicast mode and/or reception in a multicast mode.

In one embodiment of the present disclosure, the transmitting module is further used for transmitting second indication information to the terminal device, the second indication information being used for indicating to the terminal device to release the source connection.

An embodiment of the seventh aspect of the present disclosure discloses a communication apparatus, including: at least one processor; and a memory communicatively connected with the at least one processor, where the memory stores instructions executable by the at least one processor, and when executed by the at least one processor, the instructions cause the at least one processor to perform the method for receiving multicast broadcast service data according to the embodiment of the first aspect of the present disclosure.

An embodiment of the eighth aspect of the present disclosure discloses a communication apparatus, including: at least one processor, and a memory communicatively connected with the at least one processor, where the memory stores instructions executable by the at least one processor, and when executed by the at least one processor, the instructions cause the at least one processor to perform the method for receiving multicast broadcast service data according to an embodiment of the second aspect of the present disclosure, or perform the method for receiving multicast broadcast service data according to the third aspect of the present disclosure.

An embodiment of the ninth aspect of the present disclosure discloses a non-transitory computer-readable storage medium storing computer instructions, the computer instructions being used for causing the computer to perform the method for receiving multicast broadcast service data as described in the embodiment of the first aspect of the present disclosure.

An embodiment of the tenth aspect of the present disclosure discloses a non-transitory computer-readable storage medium storing computer instructions, the computer instructions being used for causing the computer to perform the method for receiving multicast broadcast service data as described in the embodiment of the third aspect of the present disclosure.

An embodiment of the eleventh aspect of the present disclosure discloses a computer program product, including a computer program, where when the computer program is executed by a processor, the method for receiving multicast broadcast service data as described in the embodiment of the first aspect of the present disclosure is implemented.

An embodiment of the twelfth aspect of the present disclosure discloses a computer program product, including a computer program, where when the computer program is executed by a processor, the method for receiving multicast broadcast service data as described in the embodiment of the second aspect of the present disclosure is implemented, or the method for receiving multicast broadcast service data as described in the embodiment of the third aspect of the present disclosure is performed.

An embodiment of the thirteenth aspect of the present disclosure discloses a system for receiving multicast broadcast service data, including a terminal device and a network-side device, where the network-side device is used for transmitting first indication information to the terminal device, the terminal device is used for receiving first indication information transmitted by the network-side device, the first indication information is used for establishing a source connection between the terminal device and a source cell and a target connection between the terminal device and a target cell; the terminal device is further used for receiving multicast broadcast service data from the source cell via the source connection; and the terminal device is further used for receiving multicast broadcast service data from the target cell via the target connection.

In one embodiment of the present disclosure, the terminal device is further used for receiving multicast broadcast service information transmitted by the network side, the multicast broadcast service information including a multicast broadcast service identity.

In one embodiment of the present disclosure, the first indication information is indication information for multicast broadcast service.

In one embodiment of the present disclosure, the multicast broadcast service identity includes at least one of: the temporary mobile group identity; the multicast broadcast service session identity; the multicast broadcast service flow identity; the multicast broadcast service bearer identity; the multicast broadcast service logical channel identity; the radio link control entity identity for the multicast broadcast service; or the multicast scheduling identity.

In one embodiment of the present disclosure, the multicast broadcast service information further includes at least one of: the identity of the source cell, or the identity of the target cell.

In one embodiment of the present disclosure, the source connection uses a unicast mode and/or a multicast mode, and the target connection uses a unicast mode and/or a multicast mode.

In one embodiment of the present disclosure, a radio bearer for receiving multicast broadcast service data in the terminal device includes a packet data convergence protocol entity; the terminal device is further used for submitting the received multicast broadcast service data in sequence to an upper protocol entity of the packet data convergence protocol entity by the packet data convergence protocol entity, according to the sequence number of the service data.

In one embodiment of the present disclosure, the terminal device is further used for transmitting the target connection failure information to the network side; the terminal device is further used for releasing the target connection; and the terminal device is further used for receiving the multicast broadcast service data from the source cell via the source connection, and stopping receiving the multicast broadcast service data from the target cell via the target connection.

In one embodiment of the present disclosure, target connection failure occurs before the terminal device receives second indication information transmitted by the network side, and the second indication information is used for instructing the terminal device to release the source connection; or target connection failure occurs before the random access between the terminal device and the target cell is successfully completed.

In one embodiment of the present disclosure, the terminal device is further used for re-establishing a connection when the source connection fails, and transmitting the target connection failure information to the network side via the re-established connection; or re-establishing the connection when the source connection fails and transmitting the target connection failure information and source connection failure information to the network side via the re-established connection; or transmitting the target connection failure information to the network side via the source connection.

In one embodiment of the present disclosure, the terminal device is further used for changing an uplink transmission path of the source connection to that of the target connection according to the first preset rule; where the source connection uses a unicast mode, and the target connection uses a unicast mode and a multicast mode; or the source connection uses a unicast mode and a multicast mode, and the target connection uses a unicast mode; or the source connection uses a unicast mode and a multicast mode, and the target connection uses a unicast mode and a multicast mode.

In one embodiment of the present disclosure, the terminal device is further used for changing a unicast path of the source connection to a unicast path of the target connection.

In one embodiment of the present disclosure, the terminal device is further used for transmitting data receiving status information via the source connection or the target connection according to a second preset rule.

In one embodiment of the present disclosure, the terminal device is further used for transmitting the data receiving status information via the target connection, where a trigger event for the data receiving status information includes: the terminal device triggering the change of the transmission path, the terminal device releasing the source connection and the source connection failure; or transmitting the data receiving status information via the source connection, where a trigger event for the data receiving status information is a target connection failure.

In one embodiment of the present disclosure, the terminal device is further used for transmitting the data receiving status information via the target connection, where the source connection uses a unicast mode and/or a multicast mode, and the target connection uses a unicast mode and a multicast mode; or the source connection uses a multicast mode, and the target connection uses a unicast mode; or the source connection uses a unicast mode and a multicast mode, and the target connection uses a unicast mode.

In one embodiment of the present disclosure, the terminal device is further used for transmitting the data receiving status information via a unicast path of the target connection, where the source connection uses a unicast mode and/or a multicast mode, and the target connection uses a unicast mode and a multicast mode.

In one embodiment of the present disclosure, the terminal device is further used for transmitting the data receiving status information via the source connection, where the source connection uses a unicast mode and a multicast mode, and the target connection uses a unicast mode and/or a multicast mode; or the source connection uses a unicast mode, and the target connection uses a multicast mode; or the source connection uses a unicast mode, and the target connection uses a unicast mode and a multicast mode.

In one embodiment of the present disclosure, the terminal device is further used for transmitting the data receiving status information via a unicast path of the source connection, where the source connection uses a unicast mode and a multicast mode, and the target connection uses a unicast mode and/or a multicast mode.

In one embodiment of the present disclosure, the terminal device is further used for releasing the source connection.

In one embodiment of the present disclosure, the terminal device is further used for receiving second indication information transmitted by the network side, the second indication information being used for indicating a release of the source connection.

In one embodiment of the present disclosure, the terminal device is further used for releasing the source connection according to a third preset rule.

In one embodiment of the present disclosure, the third preset rule includes successful completion of the random access between the terminal device and the target cell or the source connection failure.

In one embodiment of the present disclosure, the type of the source connection failure is a radio link failure.

In one embodiment of the present disclosure, the source connection fails, and the terminal device is further used for transmitting the source connection failure information to the network side.

In one embodiment of the present disclosure, the terminal device is further used for transmitting the source connection failure information to the network side via the target connection, or re-establishing the connection when the target connection fails, and transmitting the source connection failure information to the network side via the re-established connection.

In one embodiment of the present disclosure, the network-side device is further used for transmitting multicast broadcast service information to the terminal device, and the multicast broadcast service information includes a multicast broadcast service identity.

In one embodiment of the present disclosure, the network-side device is further used for transmitting first indication information to a terminal device, and transmitting request information to a target network node, the request information including request indication information, and the request indication information being used for requesting establishment of the source connection and the target connection.

In one embodiment of the present disclosure, the request information further includes multicast broadcast service information, the multicast broadcast service information includes a multicast broadcast service identity, and the first indication information is indication information for multicast broadcast service.

In one embodiment of the present disclosure, the network-side device is further used for transmitting reception configuration information of the source connection to the target network node, the reception configuration information of the source connection including reception in a unicast mode and/or reception in a multicast mode.

In one embodiment of the present disclosure, the network-side device is further used for receiving the first indication information fed back by the target network node according to the request information.

In one embodiment of the present disclosure, the network-side device is further used for receiving multicast broadcast service information fed back by the network side according to the request information, the received multicast broadcast service information including a multicast broadcast service identity, and the first indication information being indication information for multicast broadcast service.

In one embodiment of the present disclosure, the network-side device is further used for receiving request information transmitted by a source network node; the network-side device is further used for transmitting first indication information to a terminal device according to the request information, where the first indication information is used for instructing the terminal device to establish the source connection with a source cell and the target connection with a target cell, to receive multicast broadcast service data from the source cell via the source connection, and to receive the multicast broadcast service data from the target cell via the target connection.

In one embodiment of the present disclosure, the network-side device is further used for transmitting multicast broadcast service information to the terminal device via the source network node according to the request information, the multicast broadcast service information including a multicast broadcast service identity.

In one embodiment of the present disclosure, the network-side device is further used for receiving the reception configuration information of the source connection transmitted by the source network node, the reception configuration information of the source connection including reception in a unicast mode and/or reception in a multicast mode.

In one embodiment of the present disclosure, the network-side device is further used for transmitting second indication information to the terminal device, the second indication information being used for indicating to the terminal device to release the source connection.

What is claimed is:

1. A method for receiving multicast broadcast service data, performed by a terminal device, the method comprising:

receiving first indication information transmitted by a network-side device, wherein the first indication information is configured for establishing a source connection between the terminal device and a source cell and a target connection between the terminal device and a target cell;

receiving multicast broadcast service data from the source cell via the source connection; and receiving the multicast broadcast service data from the target cell via the target connection;

wherein the method further comprises:

changing an uplink transmission path from the source connection to that of the target connection according to a first preset rule;

wherein the source connection uses a unicast mode, and the target connection uses the unicast mode and a multicast mode; the source connection uses a unicast mode and a multicast mode, and the target connection uses the unicast mode; or the source connection uses a unicast mode and a multicast mode, and the target connection uses the unicast mode and the multicast mode; and wherein changing the uplink transmission path from the source connection to that of the target connection comprises:

changing a unicast path of the source connection to a unicast path of the target connection.

2. The method according to claim 1, the method further comprising:

receiving multicast broadcast service information transmitted by the network-side device, wherein the multicast broadcast service information comprises a multicast broadcast service identity, and the first indication information is indication information for a multicast broadcast service.

3. The method according to claim 2, wherein the multicast broadcast service identity comprises at least one of the following:

a temporary mobile group identity;

a multicast broadcast service session identity;

a multicast broadcast service flow identity;

a multicast broadcast service bearer identity;

a multicast broadcast service logical channel identity;

a radio link control entity identity for the multicast broadcast service; or a multicast scheduling identity;

wherein the multicast broadcast service information further comprises at least one of the following:

an identity of the source cell; or an identity of the target cell.

4. The method according to claim 1, wherein a radio bearer for receiving the multicast broadcast service data in the terminal device comprises a packet data convergence protocol entity, and the method further comprises:

submitting the received multicast broadcast service data in sequence to an upper protocol entity of the packet data convergence protocol entity according to a sequence number of service data by the packet data convergence protocol entity.

5. The method according to claim 1, wherein the method further comprises at least one of the following:

transmitting target connection failure information to the network-side device;

releasing the target connection; or receiving the multicast broadcast service data from the source cell via the source connection, and stopping receiving the multicast broadcast service data from the target cell via the target connection;

wherein a target connection failure occurs before the terminal device receives second indication information transmitted by the network-side device, and the second indication information is configured to instruct the terminal device to release the source connection; or the target connection failure occurs before a random access between the terminal device and the target cell is successfully completed.

6. The method according to claim 5, wherein transmitting the target connection failure information to the network-side device comprises:

re-establishing a connection when the source connection fails and transmitting the target connection failure information to the network-side device via the re-established connection;

re-establishing a connection when the source connection fails and transmitting the target connection failure information and source connection failure information to the network-side device via the re-established connection; or transmitting the target connection failure information to the network-side device via the source connection.

7. The method according to claim 6, further comprising:

transmitting the source connection failure information to the network-side device via the target connection; or re-establishing a connection when the target connection fails and transmitting the source connection failure information to the network-side device via the re-established connection.

8. The method according to claim 1, further comprising:

transmitting data receiving status information via the source connection or the target connection, according to a second preset rule;

wherein transmitting the data receiving status information via the source connection or the target connection according to the second preset rule comprises:

transmitting the data receiving status information via the target connection, wherein a trigger event for the data receiving status information comprises at least one of:

the terminal device triggering a change of a transmission path, the terminal device releasing the source connection, and a source connection failure; or transmitting the data receiving status information via the source connection, wherein a trigger event for the data receiving status information is a target connection failure.

9. The method according to claim 8, wherein transmitting the data receiving status information via the target connection comprises:

transmitting the data receiving status information via the target connection, wherein the source connection uses at least one of the unicast mode or the multicast mode, and the target connection uses the unicast mode and the multicast mode;

the source connection uses the multicast mode, and the target connection uses the unicast mode; or the source connection uses the unicast mode and the multicast mode, and the target connection uses the unicast mode.

10. The method according to claim 8, wherein transmitting the data receiving status information via the target connection comprises:

transmitting the data receiving status information via the unicast path of the target connection, wherein the source connection uses at least one of the unicast mode or the multicast mode, and the target connection uses the unicast mode and the multicast mode.

11. The method according to claim 8, wherein transmitting the data receiving status information via the source connection comprises:

transmitting the data receiving status information via the source connection, wherein the source connection uses the unicast mode and the multicast mode, and the target connection uses at least one of the unicast mode or the multicast mode;

the source connection uses the unicast mode, and the target connection uses the multicast mode; or the source connection uses the unicast mode, and the target connection uses the unicast mode and the multicast mode.

12. The method according to claim 8, wherein transmitting the data receiving status information via the source connection comprises:

transmitting the data receiving status information via the unicast path of the source connection, wherein the source connection uses the unicast mode and the multicast mode, and the target connection uses at least one of the unicast mode or the multicast mode.

13. The method according to claim 1, further comprising:

releasing the source connection;

wherein before releasing the source connection, the method further comprise:

receiving second indication information transmitted by the network-side device, wherein the second indication information is configured to indicate a release of the source connection.

14. The method according to claim 13, wherein releasing the source connection comprises:

releasing the source connection according to a third preset rule;

wherein the third preset rule comprises successful completion of a random access between the terminal device and the target cell or a source connection failure;

wherein a type of the source connection failure is a radio link failure.

15. A communication apparatus, comprising:

at least one processor; and a memory communicatively connected to the at least one processor, wherein the memory stores instructions executable by the at least one processor, and the instructions, when executed by the at least one processor, cause the at least one processor to perform the method for receiving the multicast broadcast service data according to claim 1.

16. A method for receiving multicast broadcast service data, performed by a network-side device, and comprising:

transmitting first indication information to a terminal device, wherein the first indication information is configured to instruct the terminal device to establish a source connection with a source cell and a target connection with a target cell, to receive multicast broadcast service data from the source cell via the source connection, and to receive the multicast broadcast service data from the target cell via the target connection;

wherein the terminal device is configured to change an uplink transmission path from the source connection to that of the target connection according to a first preset rule;

wherein the source connection uses a unicast mode, and the target connection uses the unicast mode and a multicast mode; the source connection uses a unicast mode and a multicast mode, and the target connection uses the unicast mode; or the source connection uses a unicast mode and a multicast mode, and the target connection uses the unicast mode and the multicast mode; and wherein the terminal device is further configured to change a unicast path of the source connection to a unicast path of the target connection.

17. The method according to claim 16, before transmitting the first indication information to the terminal device, further comprising:

transmitting request information to a target network node, wherein the request information comprises request indication information, and the request indication information is configured to request an establishment of the source connection and the target connection;

wherein the request information further comprises multicast broadcast service information, and the multicast broadcast service information comprises a multicast broadcast service identity, and the first indication information is indication information for a multicast broadcast service.

18. The method according to claim 17, further comprising:

receiving the first indication information fed back by the target network node according to the request information; and receiving the multicast broadcast service information fed back by the target network node according to the request information, wherein the multicast broadcast service information comprises the multicast broadcast service identity, and the first indication information is the indication information for the multicast broadcast service.

19. A method for receiving multicast broadcast service data, performed by a network-side device, and comprising:

receiving request information transmitted by a source network node; and transmitting first indication information to a terminal device according to the request information via the source network node, wherein the first indication information is configured to instruct the terminal device to establish a source connection with a source cell and a target connection with a target cell, to receive multicast broadcast service data from the source cell via the source connection, and to receive the multicast broadcast service data from the target cell via the target connection;

wherein the terminal device is configured to change an uplink transmission path from the source connection to that of the target connection according to a first preset rule;

wherein the source connection uses a unicast mode, and the target connection uses the unicast mode and a multicast mode; the source connection uses a unicast mode and a multicast mode, and the target connection uses the unicast mode; or the source connection uses a unicast mode and a multicast mode, and the target connection uses the unicast mode and the multicast mode; and wherein the terminal device is further configured to change a unicast path of the source connection to a unicast path of the target connection.

\* \* \* \* \*